United States Patent
Pillai et al.

(10) Patent No.: US 7,586,437 B2
(45) Date of Patent: Sep. 8, 2009

(54) EFFICIENT METHODS FOR WIDEBAND CIRCULAR AND LINEAR ARRAY PROCESSING

(75) Inventors: Unnikrishna Sreedharan Pillai, Harrington Park, NJ (US); Ke Yong Li, Jackson Heights, NY (US)

(73) Assignee: C & P Technologies, Inc., Closter, NJ (US)

( * ) Notice: Subject to any disclaimer, the term of this patent is extended or adjusted under 35 U.S.C. 154(b) by 157 days.

(21) Appl. No.: 11/953,095

(22) Filed: Dec. 10, 2007

(65) Prior Publication Data

US 2009/0147625 A1    Jun. 11, 2009

(51) Int. Cl.
*G01S 13/00* (2006.01)

(52) U.S. Cl. .................... 342/175

(58) Field of Classification Search ............... 342/175
See application file for complete search history.

(56) References Cited

OTHER PUBLICATIONS

Yang Y. Choa Sun Wan C., Theoretical and experimental studies on broadband constant beamwidth beamforming for circular arrays, IEEE OCEANS 2003. Proceedings,Publication Date: Sep. 22-26, 2003, vol. 3, On pp. 1647-1653 vol. 3.*
"Theoretical and Experimental Studies on Broadband Constant Beamwidth Beam forming for Circular Arrays", Yixin Yang, Chao Sun, and Chunru Wan, pp. 1647-1653.
"Subband STAP Processing, the Fifth Generation", Allan O. Steinhardt, Nicholas B. Pulsone © 2000 IEEE, pp. 1-6.
"Matrix Algebra and Its Applications to Statistics and Econometrics", C. Radhakrishna Rao, M. Bhaskara Rao, World Scientific Publising Co. Ptc, Ltd., Singapore © 1998.

\* cited by examiner

*Primary Examiner*—Thomas H Tarcza
*Assistant Examiner*—Timothy A Brainard
(74) *Attorney, Agent, or Firm*—Walter J. Tencza, Jr.

(57) ABSTRACT

The objective of this patent is to develop new signal processing algorithms for a wide-band circular electronically scanned array (CESA) or a wideband linear electronically scanned array (LESA) for use in surveillance and communications applications, where a sequence of pulses are transmitted and their returns are collected by the array for further processing. Instead of partitioning the entire wideband frequency into various subbands and then processing them separately using narrowband schemes, a frequency focusing method is proposed here to compensate and focus the wideband spatio-temporal data into a single narrow frequency band. This is made possible by operating with a pre-computed frequency focusing matrix that transforms the data from various frequency slots that are spread across the entire wideband region into a common narrowband frequency for the array outputs. Finally the focused narrowband data can be processed using conventional space-time adaptive processing methods to suppress the clutter/noise returns and detect any targets present.

30 Claims, 14 Drawing Sheets

Fig. 2A
Fig. 2B
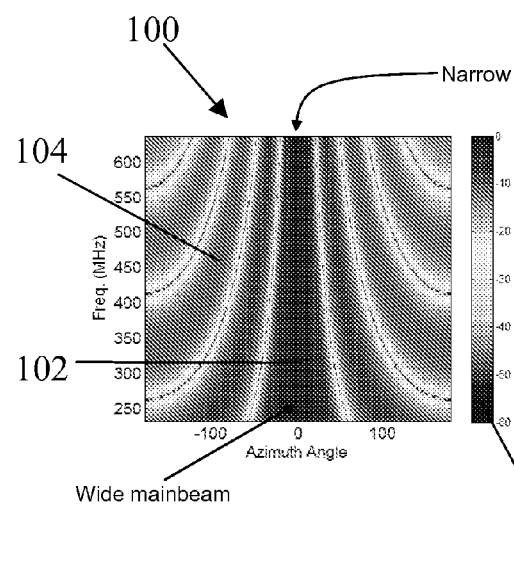
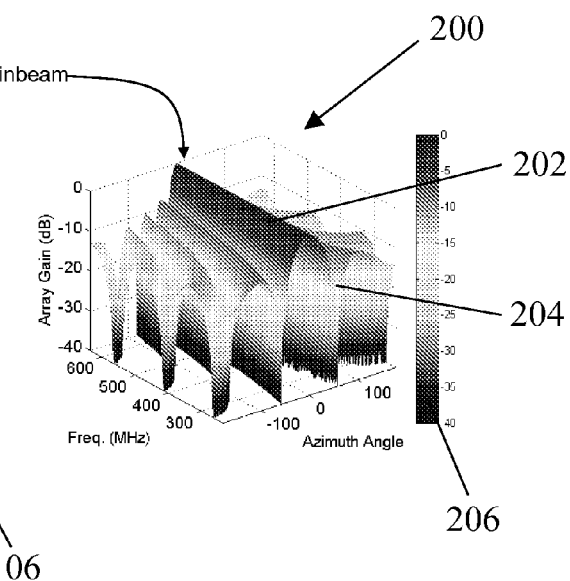

Fig. 12A
Fig. 12B
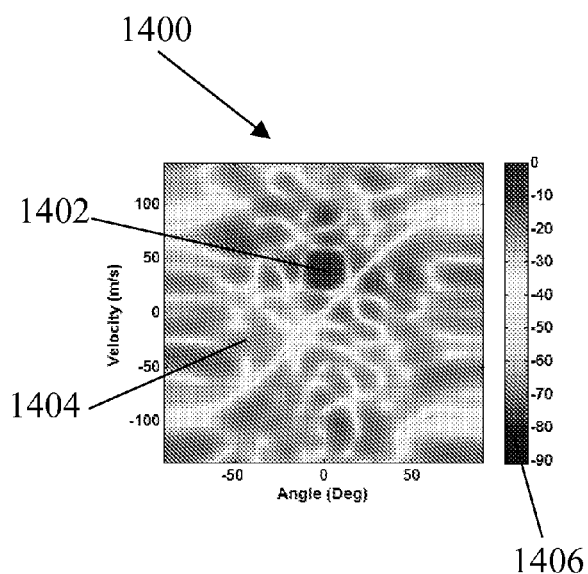
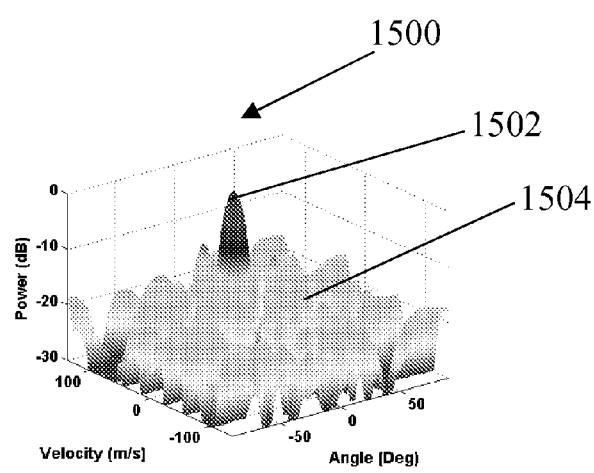

EFFICIENT METHODS FOR WIDEBAND CIRCULAR AND LINEAR ARRAY PROCESSING

STATEMENT REGARDING FEDERALLY SPONSORED RESEARCH OR DEVELOPMENT

The present invention is based upon work supported and/or sponsored by the Air Force Research Laboratory (AFRL), Rome, N.Y., under contract No. FA8750-06-C-0117.

FIELD OF THE INVENTION

This invention relates to improved methods and apparatus concerning wideband circular and linear array processing.

BACKGROUND OF THE INVENTION

Wideband systems are used for improved range resolution without compromising on Doppler resolution. However wideband arrays introduce distortion due to the wide bandwidth introduced, and for problems involving one-dimensional angular search methods have been developed to address this difficulty. [Y. Yang, C. Sun, and C. Wan, "Theoretical and Experimental Studies on Broadband Constant Beamwidth Beamforming for Circular Array", Proceedings of OCEANS 2003, Vol. 3. pp. 1647-1653, September 2003]. Circular arrays allow open access around the entire 360 degrees and in addition scanning in the elevation direction become possible. Linear arrays are also often used in radar and communication problems.

However, processing the data becomes often difficult because of the wideband nature of the problem. Traditionally the wideband data is partitioned into several narrowband data segments, and then they are processed separately or together by stacking up the various frequency components in a vector format. In this later approach, spatial domain, and with temporal domain data when stacked up together with frequency domain results in three-dimensional (3-D) data that adds severe computational burden for processing. [A. O. Steinhardt and N. B. Pulsone "Subband STAP processing, the Fifth Generation," Proceedings of the Sensor Array and Multichannel Signal Processing Workshop, Cambridge, Mass., March 2000]. In this context, a new signal processing strategy that separates the frequency and the angular variables into two components is investigated in the joint azimuth-elevation domain, so that efficient algorithms can be designed to process the entire wideband data simultaneously.

SUMMARY OF THE INVENTION

One or more embodiments of the present invention provide signal processing methods for a wide-band circular electronically scanned array (CESA) and a wideband linear electronically scanned array (LESA) for use in surveillance and communications applications.

One or more embodiments of the present invention provide an efficient receiver processing strategy for electronically scanned circular array or linear array that operate in a wideband radio frequency (RF) spectrum. The instantaneous bandwidth, sidelobe levels, and beam agility, etc. for the electronically scanned circular array or linear array or one or more embodiments of the present invention are sufficient for both communications techniques and extremely high-resolution synthetic aperture radar (SAR) and ground moving target indicator (GMTI) radar modes. Control of the electronically scanned circular array or linear array is typically sufficient to form multiple beams (possibly for separate, simultaneous modes) around the entire three hundred sixty degrees.

In accordance with a method of an embodiment of the present invention, a circular array is analyzed first in the wideband context for simultaneous beam steering both in the azimuth and elevation directions. New signal processing schemes are formulated to exploit the wideband nature of the problem by reducing the computational burden. A new signal processing strategy that separates the frequency and the angular variables into two separate components is investigated in the joint azimuth-elevation domain, and efficient algorithms are designed to process by frequency compensating or focusing the entire wideband data in the frequency domain simultaneously to a single frequency band. This results in new wideband space-time adaptive processing (STAP) methods for a circular array. The frequency compensating or focusing method is also extended to the wideband linear array case for both frequency focusing and adaptive processing.

BRIEF DESCRIPTION OF THE DRAWINGS

FIG. 2A shows a top view of non-uniform main beam width for a gain function of a wideband circular array, in accordance with an embodiment of the present invention, with twenty-five sensors;

FIG. 2B shows a side view of the non-uniform main beam width for the gain function of FIG. 2A;

FIG. 12A shows a top-view diagram of the focused output SINR in the joint azimuth-Doppler domain in accordance with one or more embodiments of the present invention for a wideband linear array such as in FIG. 11 using fourteen sensors and sixteen pulses. Injected target located at zero azimuth angle and ninety degrees elevation angle is moving with velocity 40 meters/second. Clutter to noise ratio is 40 decibels;

FIG. 12B shows a side-view diagram of the focused output SINR in the joint azimuth-Doppler domain in accordance with one or more embodiments of the present invention for a wideband linear array such as in FIG. 11 using fourteen sensors and sixteen pulses. Injected target located at zero azimuth angle and ninety degrees elevation angle is moving with velocity 40 meters/second. Clutter to noise ratio is 40 decibels;

DETAILED DESCRIPTION OF THE DRAWINGS

Figure 1:
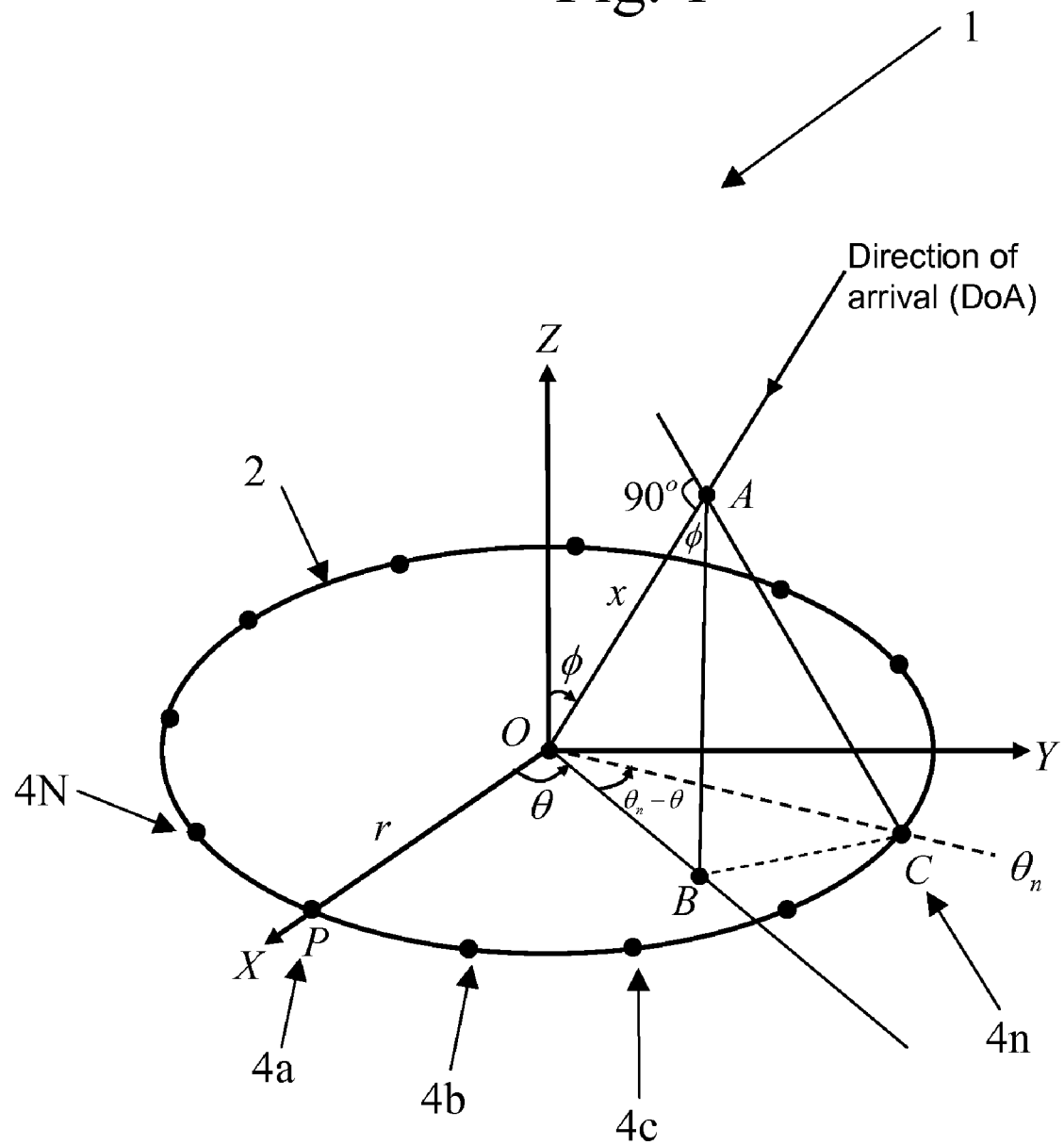
FIG. 1 shows a diagram of circular array apparatus in accordance with an embodiment of the present invention.

FIG. 1 shows a diagram of a circular array apparatus 1 in accordance with an embodiment of the present invention. The apparatus 1, where 1 includes a circular element, 2 of radius r on which is located a plurality of sensors 4a-4N, each shown as a dot or point on the circular element 2 2. Sensor 4a refers to the first reference sensor, 4n to the $n^{th}$ sensor and 4N to the last sensor. The circular element 2 has a center, origin, or reference point "O". FIG. 1 shows a "z-axis" labeled as "OZ", and x and y axes labeled as OX and OY. FIG. 1 shows an angle θ between the reference line x axis OX and the line OB through the plane of the circular element 2, and an angle $\theta_n$ that refers to the $n^{th}$ sensor, 4n, also with reference to the x axis OX. Similarly φ refers to the angle between the z-axis OZ and the line OA.

FIG. 1 shows a circular array 2 with N sensors (sensors 4a-4N) such as that in a helicopter mounted array. The sensors 4a-4N are uniformly placed around the circumference of the circular element 2 at a radial distance r from the reference point O (FIG. 1). In FIG. 1, O denotes the origin, OP the reference direction along the first sensor (also the x-axis or OX), or sensor 4a, and OA denotes the normal to an arbitrary wavefront of interest that generates the plane wave AC when it passes through the $n^{th}$ receiver 4n located at point C. A perpendicular line AB is drawn from the point A to the plane of the circle of the circular element 2 to meet the plane at point B. FIG. 1 also shows lines OB, BC and OC joined into a triangle. In the configuration of FIG. 1:

$$\angle POB = \theta, \quad \angle QOA = \phi, \quad \angle POC = \theta_n = \frac{2\pi(n-1)}{N}, \quad (1)$$
$$n = 1, 2, \ldots N$$

so that $\angle BOC = \theta_n - \theta$.

The unknown distance OA=x is of interest, since x/c represents the time delay of the wavefront AC through the $n^{th}$ sensor at C with respect to the reference point O. Here c italicize represents the speed of light. From the right angled triangle AOB, we have $$OB = x \sin \phi, \ AB = x \cos \phi, \ OC = r, \quad (2)$$

so that from ΔOBC, the law of cosines gives $$BC^2 = OB^2 + OC^2 - 2OB \cdot OC \cdot \cos(\theta - \theta_n) \quad (3)$$
$$= x^2 \sin^2 \phi + r^2 - 2rx\sin\phi\cos(\theta - \theta_n).$$

Also from the right angled triangle ABC, we get $$AC^2 = AB^2 + BC^2 \quad (4)$$
$$= x^2 \cos^2 \phi + BC^2$$
$$= x^2 + r^2 - 2rx\sin\phi\cos(\theta - \theta_n).$$

Finally from the right angled triangle OAC, we get $$OC^2 = OA^2 + AC^2 \quad (5)$$

or $$r^2 = x^2 + (x^2 + r^2 - 2r x \sin \phi \cos(\theta - \theta_n)) \quad (6)$$

or we get the desired expression $$x = r \sin \phi \cos(\theta - \theta_n), n = 1, 2 \ldots N. \quad (7)$$

This gives the signal $x_n(t)$ at the $n^{th}$ sensor with respect to the reference signal s(t) to be $$x_n(t) = s(t - \tau_n), \quad n = 1, 2, \ldots N \quad (8)$$
where
$$\tau_n = \frac{x}{c} = \frac{r}{c}\sin\phi\cos(\theta - \theta_n) \quad (9)$$

and s(t) represents the wideband transmit signal at the origin. Notice that equations (8) and (9) account for both the azimuth angle θ and the elevation direction φ simultaneously. From equations (8)-(9), the wideband clutter data received from the entire field of view will be of the form $$x_n(t) = \sum_i \sum_k \alpha_{i,k} s(t - \tau_n(i,k)) \quad (10)$$
where
$$\tau_n(i,k) = \frac{r}{c}\sin\phi_k\cos(\theta_i - \theta_n) \quad (11)$$

and $\alpha_{i,k}$ represents the scatter return from azimuth location $\theta_i$ and elevation direction $\phi_k$. In addition, when a target is also present in some unknown direction ($\theta_o$, $\phi_o$), the data has the form $$x_n(t) = s_t(t - \tau_n(i_o, k_o)) + \sum_i \sum_k \alpha_{i,k} s(t - \tau_n(i, k)). \quad (12)$$

Before proceeding to analyze efficient clutter nulling and target detection methods, it is important to address the wideband issue in equations (10)-(12) and its implications on beam forming.

Towards this, Fourier transform of the wideband signal in equation (8) gives $$x_n(t) \leftrightarrow X_n(\omega) = S(\omega)e^{-j\omega\tau_n} = S(\omega)e^{-j\omega\frac{r}{c}\sin\phi\cos(\theta-\theta_n)}, \quad (13)$$
$$n = 1, 2, \ldots N.$$

Notice that the phasor term in equation (13) is frequency dependent and equation (13) gives the array output vector transform to be $$\underline{X}(\omega) = \begin{bmatrix} X_1(\omega) \\ X_2(\omega) \\ \vdots \\ X_N(\omega) \end{bmatrix} \quad (14)$$

$$= S(\omega) \begin{bmatrix} e^{-j\omega\frac{r}{c}\sin\phi\cos(\theta-\theta_1)} \\ e^{-j\omega\frac{r}{c}\sin\phi\cos(\theta-\theta_2)} \\ \vdots \\ e^{-j\omega\frac{r}{c}\sin\phi\cos(\theta-\theta_N)} \end{bmatrix}$$

$$\triangleq S(\omega)\underline{a}(\omega, \phi, \theta).$$

Clearly from equation (14), any beamforming application must address the frequency dependent nature of the spatial steering vector $\underline{a}(\omega, \phi, \theta)$. The steering vector in equation (14) gives rise to the following gain function $$G(\omega, \phi, \theta) = \left|\frac{1}{N}\underline{w}_\omega^* \underline{a}(\omega, \phi, \theta)\right|^2 \quad (15)$$

$$= \left|\frac{1}{N}\sum_{n=1}^N w_n^* e^{-j\omega\frac{r}{c}\sin\phi\cos(\theta-\theta_n)}\right|^2$$

where $$\underline{w}_\omega = [w_1, w_2, \ldots w_N]^T, \quad w_n = e^{-j\omega\frac{r}{c}\sin\phi_o\cos(\theta_o-\theta_n)} \quad (16)$$

represents the weight vector to focus the array pattern to the azimuth angle $\theta_o$ and elevation angle $\phi_o$. Here onwards, for vectors and matrices such as A, the symbols $A^T$ and $A^*$ represent the transpose and the complex conjugate transpose of A respectively.

FIG. 2A shows a diagram 100 of a top view of non-uniform main beam width for a gain function of a wideband circular array similar to the circular array in FIG. 1, in accordance with an embodiment of the present invention, with twenty-five sensors. In this example, the elevation angle $\phi$ of the wavefront projected by the target is fixed at ninety degrees and the frequency range is between 235 MHz (Megahertz) and 635 MHz (Megahertz). The diagram 100 includes sections 102, 104 and 106. Section 102 shows the frequency sensitive mainbeam gain function versus azimuth angle $\theta$ shown in FIG. 1, section 104 shows the sidelobe gain function azimuth angle $\theta$ shown in FIG. 1, and section 106 shows the scaling function used here with lighter region representing lower gain levels in dB (decibels).

FIG. 2B shows a diagram 200 of a side view illustrating the non-uniform main beam width for the gain function of FIG. 2A. The diagram 200 includes sections 202, 204 and 206. Section 202 shows the frequency sensitive main-beam gain function versus azimuth angle $\theta$ shown in FIG. 1, section 204 shows the side-lobe gain function azimuth angle $\theta$ in FIG. 1, and section 206 shows the scaling function used here with the lighter region representing lower gain levels in dB (decibels). In the example of FIG. 2B, the elevation angle is fixed at ninety degrees and the frequency range is between 235 MHz (Megahertz) and 635 MHz (Megahertz).

Notice that the mainbeam width is frequency dependent since it is narrow at high frequencies and wider at lower frequencies, and this phenomenon is undesirable since the array focused along a specific direction can project different gain functions depending on the frequency.

To address this frequency dependent issue, it is necessary to do prior processing so as to re-focus various frequency components into a reference frequency component. Towards this, using the identity $$\sin\phi\cos(\theta - \theta_n) = \frac{\sin(\phi + \theta - \theta_n) + \sin(\phi - \theta + \theta_n)}{2} \quad (17)$$

in equations (13)-(14) we get $$X_n(\omega) = S(\omega)e^{-j\frac{\omega r}{2c}\sin(\phi+\theta-\theta_n)}e^{-j\frac{\omega r}{2c}\sin(\phi-\theta+\theta_n)}, \quad n-1, 2, \ldots N. \quad (18)$$

Towards simplifying equation (18) further, consider the periodic term $$e^{-j\frac{\omega r}{2c}\sin(\phi+\theta-\theta_n)} \triangleq e^{-j\beta(\omega)\sin\psi} \quad (19)$$

where $$\beta(\omega) = \frac{\omega r}{2c}, \quad \psi = \phi + \theta - \theta_n. \quad (20)$$

Fourier series expansion of equation (19) gives the identity $$e^{-j\beta(\omega)\sin\psi} = \sum_{k=-\infty}^{+\infty} J_k(\beta)e^{-jk\psi} \quad (21)$$

where $$J_k(\beta) = \frac{1}{2\pi}\int_{-\pi}^{\pi} e^{-j(\beta\sin\psi-k\psi)} d\psi \quad (22)$$

$$= \frac{1}{\pi}\int_0^{\pi} \cos(\beta\sin\psi - k\psi) d\psi$$

represents the Bessel functions of the first kind and $k^{th}$ order [G. N. Watson, "A Treatise on the Theory of Bessel Functions", Second Edition, Cambridge University Press, 1952, Pages 19-22]. Substituting (21)-(22) into (19) we get $$e^{-j\frac{\omega r}{2c}\sin(\phi+\theta-\theta_n)} = \sum_{k=-\infty}^{+\infty} J_k(\beta(\omega))e^{-jk(\phi+\theta-\theta_n)} \quad (23)$$

$$= \sum_{k=-\infty}^{+\infty} J_k(\beta(\omega))e^{jk\theta_n}e^{-jk(\phi+\theta)}$$

$$= \sum_{k=-\infty}^{+\infty} A_{n,k}(\omega)e^{-jk(\phi+\theta)}$$

where we define $$A_{n,k}(\omega)=J_k(\beta(\omega))e^{-jk\theta_n}, \; k=-L,-(L-1),\ldots 0,1,\ldots,L. \quad (24)$$

Similarly $$e^{-j\frac{\omega r}{2c}\sin(\phi-\theta+\theta_n)} = \sum_{k=-\infty}^{+\infty} B_{n,k}(\omega)e^{-jk(\phi-\theta)} \quad (25)$$

where we define $$B_{n,k}(\omega)=J_k(\beta(\omega))e^{jk\theta_n}, \; k=-L,-(L-1),\ldots 0,1,\ldots,L. \quad (26)$$

The Bessel function coefficients in equations (24)-(26) decay down rapidly and the summations in equations (23) and (25) can be replaced with a finite number of terms (such as ten to fifteen terms).

Figure 3:
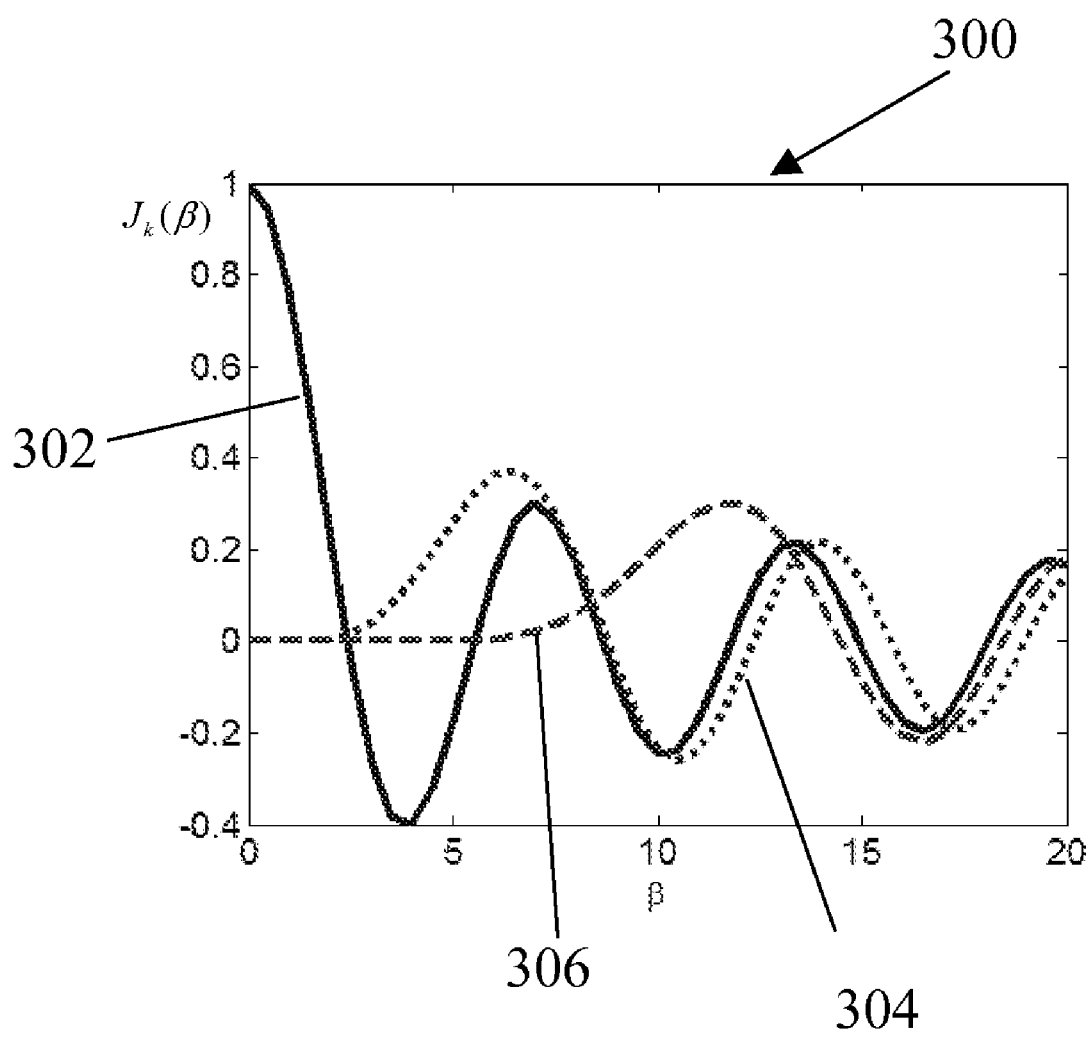
FIG. 3 shows a diagram of a Bessel function as a function of $\beta$ for three different order values.

FIG. 3 shows a diagram 300 of a Bessel function as a function of β (along the x axis) for three different order index k. The diagram 300 includes sections 302, 304 and 306. Section 302 shows the solid line for order index value of zero, section 304 shows the dotted line for order index value of 5, and section 306 shows the dashed line for order index value of 10. Bessel functions are well documented in the literature, and can be readily precomputed and stored in a computer processor.

Substituting equations (23)-(26) into equations (18)-(19) we get (with $S(\omega)\equiv 1$ in (18))

$$X_n(\omega) = e^{-j\frac{\omega r}{2c}\sin(\phi-\theta+\theta_n)} \quad (27)$$

$$= \sum_{k=-L}^{+L} A_{n,k}(\omega)e^{-jk(\phi+\theta)} \sum_{m=-L}^{+L} B_{n,m}(\omega)e^{-jm(\phi-\theta)}.$$

From equations (24) and (26), the coefficients $\{A_{n,k}(\omega)\}$ and $\{B_{n,k}(\omega)\}$ are frequency dependent. Using equation (27) in equation (14), we obtain the circular array output vector to be:

$$X(\omega) = a(\omega, \phi, \theta) \quad (28)$$

$$= \begin{bmatrix} \vdots \\ \sum_{k=-L}^{+L} A_{n,k}(\omega)e^{-jk(\phi+\theta)} \\ \vdots \end{bmatrix} \cdot \begin{bmatrix} \vdots \\ \sum_{k=-L}^{+L} B_{n,k}(\omega)e^{-jk(\phi-\theta)} \\ \vdots \end{bmatrix}$$

$$= A(\omega)s_1 \cdot B(\omega)s_2$$

where the symbol ∘ represents the element wise Schur-Hadamard product that is well known in the literature, and $$A(\omega) = \begin{pmatrix} A_{1,-L}(\omega) & A_{1,-(L-1)}(\omega) & \ldots & A_{1,L}(\omega) \\ A_{2,-L}(\omega) & A_{2,-(L-1)}(\omega) & \ldots & A_{2,L}(\omega) \\ \vdots & \vdots & \ddots & \vdots \\ A_{N,-L}(\omega) & A_{N,-(L-1)}(\omega) & \ldots & A_{N,L}(\omega) \end{pmatrix}, \quad (29)$$

$$B(\omega) = \begin{pmatrix} B_{1,-L}(\omega) & B_{1,-(L-1)}(\omega) & \ldots & B_{1,L}(\omega) \\ B_{2,-L}(\omega) & B_{2,-(L-1)}(\omega) & \ldots & B_{2,L}(\omega) \\ \vdots & \vdots & \ddots & \vdots \\ B_{N,-L}(\omega) & B_{N,-(L-1)}(\omega) & \ldots & B_{N,L}(\omega) \end{pmatrix} \quad (30)$$

where $A_{n,k}(\omega)$ and $B_{n,k}(\omega)$ are as defined in equations (24) and (26) respectively. Further let $$\underline{s}(\theta)=[e^{jL\theta},\ldots e^{j\theta}, 1, e^{-j\theta}, \ldots e^{-jL\theta}]^T. \quad (31)$$

and $$\underline{s}_1=\underline{s}(\phi+\theta), \; \underline{s}_2=\underline{s}(\phi-\theta). \quad (32)$$

Notice that in equation (28) the frequency dependent steering vector has been broken up into two frequency dependent matrix components $A(\omega)$ and $B(\omega)$ and two frequency independent steering vector components $\underline{s}(\phi+\theta)$ and $\underline{s}(\phi-\theta)$.

To separate out frequency components exclusively, a new strategy in accordance with one or more embodiments of the present invention is developed here as follows: Towards this, one or more embodiments of the present invention need to make use of a matrix result involving the Khatri-Rao product [C. G. Khatri, and C. R. Rao, "Solutions to Some Functional Equations and Their Applications to Characterization of Probability Distributions," Sankhya: The Indian J. Stat., Series A, 30, pp. 167-180, 1968]: If $A=(\underline{a}_1 \; \underline{a}_2 \; \ldots \; \underline{a}_n)$, $B=(\underline{b}_1 \; \underline{b}_2 \ldots \underline{b}_n)$ represent two matrices then their Khatri-Rao product $A \odot B$ is given by $$A \odot B = (\underline{a}_1 \otimes \underline{b}_1 \; \underline{a}_2 \otimes \underline{b}_2 \ldots \underline{a}_n \otimes \underline{b}_n) \quad (33)$$

where $\underline{a}_1 \otimes \underline{b}_1$ represents the well known Kronecker product of vectors $\underline{a}_1$ and $\underline{b}_1$ [C. R. Rao and M. B. Rao, Matrix Algebra and its Applications to Statistics and Econometrics, World Scientific, Singapore, 1998].

Let A and B represent two m×n matrices and let $\underline{a}$ and $\underline{b}$ represent two n×1 vectors. Then the important identity [S. U. Pillai, K. Y. Li, and B. Himed, "Space Based Radar—Theory and Applications", Chapter 1, Pages 18-25, McGraw Hill, New York, To be published in December 2007] below is obtained $$A\underline{a} \circ B\underline{b}=(A^T \odot B^T)^T(\underline{a} \otimes \underline{b}). \quad (34)$$

In equation (34), ∘ represents the element wise Schur-Hadamard product, and ⊙ represents the Khatri-rao product cited in equation (33). Using equation (34) in equation (28) the following is determined $$X(\omega) = a(\omega, \phi, \theta) \simeq A(\omega)s_1 \cdot B(\omega)s_2 \quad (35)$$

$$= (A^T(\omega) \odot B^T(\omega))^T (s_1 \otimes s_2) = P(\omega)(s_1 \otimes s_2)$$

where $$P(\omega) = (A^T(\omega) \odot B^T(\omega))^T \quad (36)$$

is $N\times(2L+1)^2$. Notice that in equation (35), the frequency dependent steering vector $\underline{a}(\omega, \phi, \theta)$ has been separated into a frequency dependent matrix $P(\omega)$, and a vector $\underline{s}_1 \otimes \underline{s}_2$ that does not depend upon the frequency. Equations (35)-(36) can be used to refocus the steering vectors $\underline{a}(\omega_k, \phi, \theta)$, k=1, 2, ... K to any reference frequency $\omega_o$ as follows: From equations (35)-(36), the following is determined $$\underline{a}(\omega, \phi, \theta) = P(\omega)(\underline{s}_1 \otimes \underline{s}_2) \quad (37)$$

so that $$A(\omega, \phi, \theta) = \begin{bmatrix} a(\omega_1, \phi, \theta) \\ a(\omega_2, \phi, \theta) \\ \vdots \\ a(\omega_K, \phi, \theta) \end{bmatrix} \quad (38)$$

$$= \begin{bmatrix} P(\omega_1) \\ P(\omega_2) \\ \vdots \\ P(\omega_K) \end{bmatrix} (s_1 \otimes s_2) \triangleq F(\omega)(s_1 \otimes s_2)$$

where $$F(\omega) = \begin{bmatrix} P(\omega_1) \\ P(\omega_2) \\ \vdots \\ P(\omega_K) \end{bmatrix} \quad (39)$$

is of size NK×(2L+1)$^2$. This gives $$P(\omega_o)(F^*(\underline{\omega})F(\underline{\omega}))^{-1}F^*(\underline{\omega})\underline{A}(\underline{\omega}, \phi, \theta) =$$
$$P(\omega_o)(\underline{s}_1 \otimes \underline{s}_2) = \underline{a}(\omega_o, \phi, \theta). \quad (40)$$

In rank deficient situations, the inversion in equation (40) is to be interpreted as the pseudo inverse. In such cases, to facilitate the inversion of $F^*(\underline{\omega})F(\underline{\omega})$ in equation (40), a small diagonal loading additive term $\epsilon I$, $\epsilon > 0$ may be added to it to generate $(F^*(\underline{\omega})F(\underline{\omega}) + \epsilon I)$ prior to inversion. Here I represents the identity matrix of appropriate size. Observe that different frequency components $\omega_o$ in equation (38) have been focused into one signal component in equation (40). From equation (40), define the frequency compensating or focusing operator:

$$T(\omega_o, \underline{\omega}) = P(\omega_o)(F^*(\underline{\omega})F(\underline{\omega}))^{-1}F^*(\underline{\omega}) \quad (41)$$

so that equation (40) reads $$T(\omega_o, \underline{\omega})\underline{A}(\underline{\omega}, \phi, \theta) = \underline{a}(\omega_o, \phi, \theta). \quad (42)$$

In other words, the matrix $T(\omega_o, \underline{\omega})$ refocuses the various frequency terms in $\underline{A}(\underline{\omega}, \phi, \theta)$ to a single reference frequency $\omega_o$. The new gain pattern corresponding to (42) is given by $$G_1(\phi, \theta) = |\underline{w}_{\omega_o}{}^* T(\omega_o, \underline{\omega})\underline{A}(\underline{\omega}, \phi, \theta)|^2. \quad (43)$$

where $\underline{w}_{\omega_o}$ is as defined in (16) with $\omega = \omega_o$.

Figure 4:
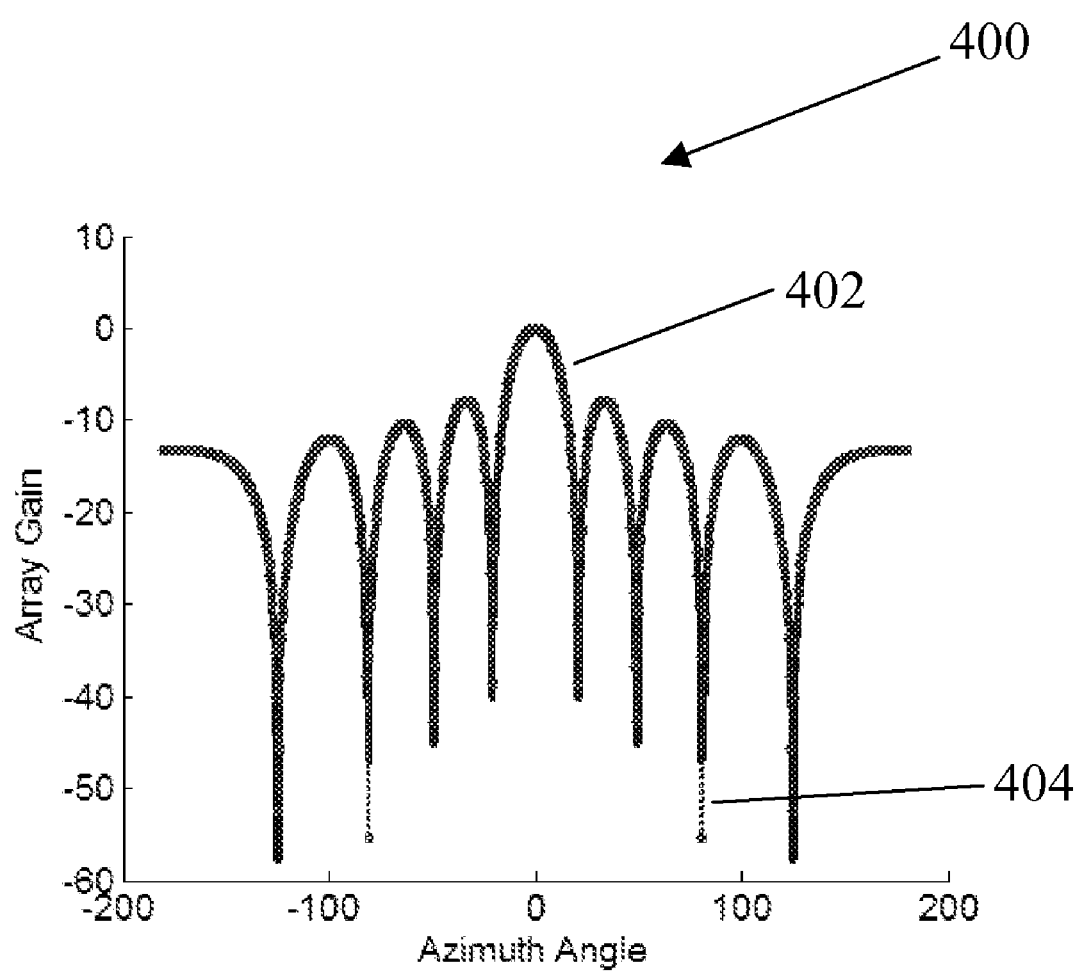
FIG. 4 shows a diagram of a focused wideband gain pattern for a circular array in the azimuth direction with elevation angle fixed at ninety degrees.

FIG. 4 shows a diagram 400 of a focused wideband gain pattern for a circular array along with the gain pattern at a reference frequency of 635 MHz, such as circular array 2—in the azimuth direction with elevation angle fixed at ninety degrees. In the example of FIG. 4, a wideband signal is split into one hundred frequency bands, each with a bandwidth of 4 MHz, and focused to the reference frequency of 635 MHz using fifteen Bessel function terms. The diagram 400 includes sections 402 and 404. Section 402 shows the solid line corresponding to the focused array gain pattern and section 404 shows the dotted line corresponding to the reference frequency array gain pattern. Observe that both these diagrams coincide, indicating the effectiveness of the focusing method.

FIG. 4 shows the refocused gain pattern in the azimuth direction corresponding to the twenty-five element circular array referred in FIG. 2 that has one hundred distinct frequency bands all refocused to the frequency (635 MHz) along with the gain pattern at a reference frequency of 635 MHz. Here the elevation angle is fixed at $\pi/2$.

Notice that the focused wideband gain pattern in FIG. 4 has the same array gain across frequency and can be used simultaneously to process all frequency components. The treatment above considers the general case for an arbitrary azimuth angle $\theta$ and elevation angle $\phi$, and hence a platform, such as an airborne radar platform holding a circular array, such as 2 in FIG. 1, can be held steady while the array 2 electronically sweeps an entire joint azimuth-elevation domain.

Figure 5A:
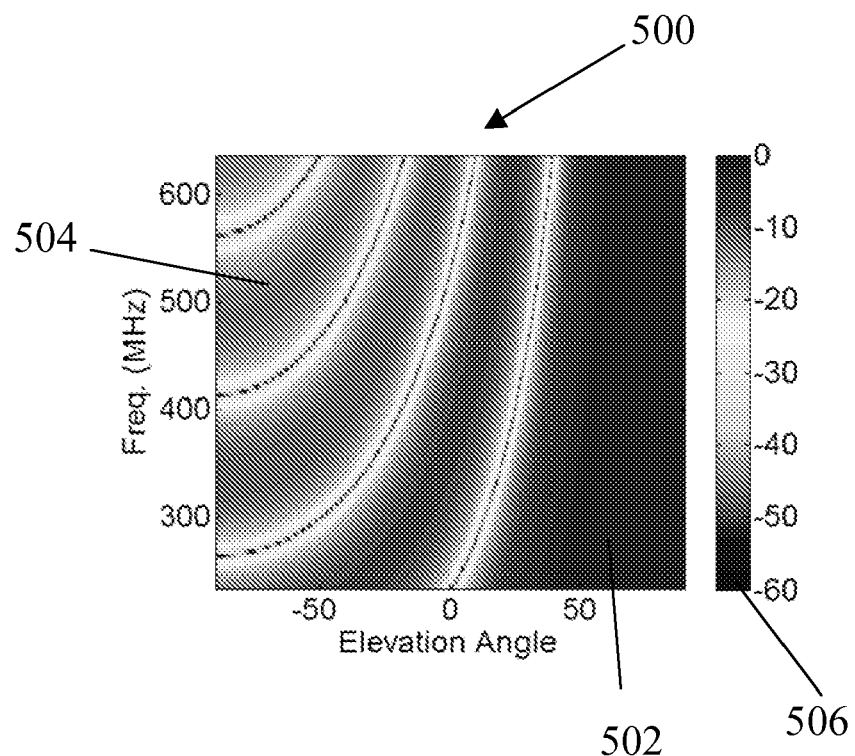
FIG. 5A shows a diagram of a wideband gain unfocused beam pattern for a circular array in the elevation direction with azimuth angle fixed at zero degrees.

FIG. 5A shows a diagram 500 of frequency in MHz versus elevation angle, of a wideband gain unfocused beam pattern for a twenty-five element circular array referred in FIG. 2, such as circular array 2 with azimuth angle fixed at zero degrees. FIG. 5A shows an unfocused beam pattern with frequency dependent gain patterns. The diagram 500 includes sections 502, 504 and 506. Section 502 shows the frequency dependent main lobe region, section 504 shows the side lobe region and section 506 shows the scaling function used here with the lighter region representing lower gain levels in dB (decibels).

Figure 5B:
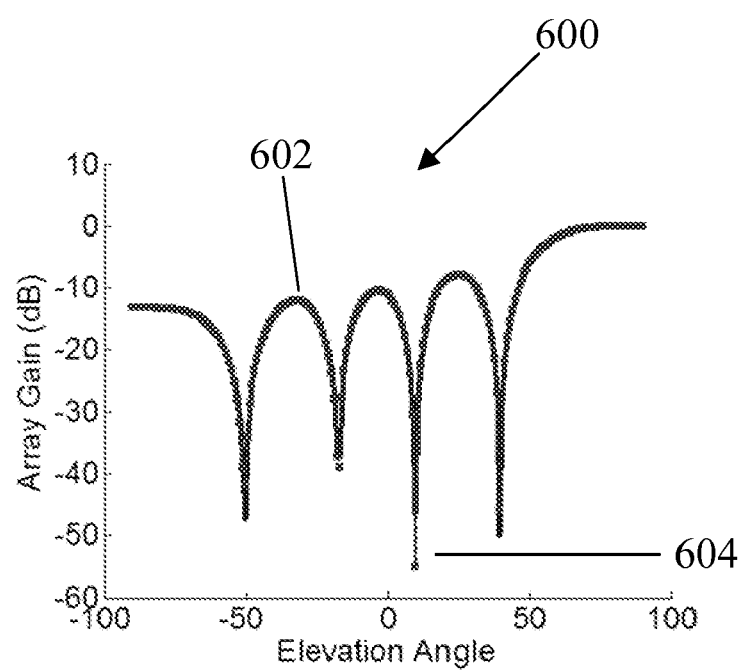
FIG. 5B shows a diagram of a wideband gain focused beam pattern for a circular array in the elevation direction with azimuth angle fixed at zero degrees.

FIG. 5B shows a diagram 600 of array gain for a frequency focused array shown in FIG. 5A versus elevation angle. FIG. 5B shows a diagram of a wideband gain focused beam pattern for a circular array in the elevation direction with azimuth angle fixed at zero degrees. FIG. 5B shows a focused uniform gain pattern across all frequencies. All frequencies are focused to 635 MHz using fifteen Bessel function terms. The diagram 600 includes sections 602 and 604. Section 602 shows the solid line representing the focused gain function in the elevation domain and section 604 shows the dotted line representing the reference frequency gain function at a frequency of 635 MHz.

The important breakdown in equation (35) when applied to the clutter data $x_n(t)$ in equation (12) is effective in making the clutter data from all azimuth-elevation locations refocus at a common frequency point using the same frequency focusing operator for all locations.

To see this, from one or more embodiments of the present invention, the Fourier transform of the total received data at the n$^{th}$ sensor, such as 4n in FIG. 1, in equation (12) gives:

$$X_n(\omega) = \quad (44)$$
$$S(\omega)e^{-j\omega\frac{r}{c}\sin\phi_{k_o}\cos(\theta_{i_o} - \theta_n)} + S(\omega)\sum_i \sum_k \alpha_{ik} e^{-j\omega\frac{r}{c}\sin\phi_k\cos(\theta_i - \theta_n)}.$$

Following equation (14), the transform of the total array output vector $\underline{X}(\omega)$ takes the form $$X(\omega) = \begin{bmatrix} X_1(\omega) \\ X_2(\omega) \\ \vdots \\ X_N(\omega) \end{bmatrix} \quad (45)$$

$$= S(\omega)a(\omega, \phi_{k_o}, \theta_{i_o}) + S(\omega)\sum_i \sum_k \alpha_{ik} a(\omega, \phi_k, \theta_i)$$

where we have used equation (44) for $X_n(\omega)$, $n=1, 2, \ldots N$. Following equation (37), each frequency dependent steering vector $\underline{a}(\omega, \phi_k, \theta_i)$ in equation (45) can be written as:

$$\underline{a}(\omega, \phi_k, \theta_i) = P(\omega)(\underline{s}_1(i,k) \otimes \underline{s}_2(i,k)) = P(\omega)\underline{q}(i,k), \quad (46)$$

where $$\underline{s}_1(i,k) = \underline{s}(\phi_k + \theta_i), \quad (47)$$

$$\underline{s}_2(i,k) = \underline{s}(\phi_k - \theta_i) \quad (48)$$

and $$\underline{q}(i,k) = \underline{s}_1(i,k) \otimes \underline{s}_2(i,k) \quad (49)$$

where $\underline{s}(i,k)$ is defined in equation (31). From equations (45)-(49), we get:

$$X(\omega_m) = P(\omega_m)S(\omega_m)\underline{q}(i_o, k_o) + P(\omega_m)S(\omega_m)\sum_i \sum_k \alpha_{ik}\underline{q}(i,k), \quad (50)$$

$$m = 1, 2, \ldots K.$$

Note that the frequency dependent part $P(\omega_m)$ in equation (50) is the same for each term in the summation and hence it can be pulled outside the summation.

At this stage the unfocused received data vector in equation (50) at various frequencies can be stacked together as in equation (38) to generate the NK×1 vector $$\underline{Y}(\omega) = \begin{pmatrix} \underline{X}(\omega_1) \\ \underline{X}(\omega_2) \\ \vdots \\ \underline{X}(\omega_K) \end{pmatrix} = \underbrace{\begin{pmatrix} P(\omega_1) \\ P(\omega_2) \\ \vdots \\ P(\omega_K) \end{pmatrix}}_{F(\omega)}\underline{q}(i_o, k_o) + \quad (51)$$

$$\underbrace{\begin{pmatrix} P(\omega_1) \\ P(\omega_2) \\ \vdots \\ P(\omega_K) \end{pmatrix}}_{F(\omega)}\sum_i \sum_k \alpha_{ik}\underline{q}(i,k)$$

$$= F(\omega)\underline{q}(i_o, k_o) + F(\omega)\sum_i \sum_k \alpha_{ik}\underline{q}(i,k),$$

where $F(\underline{\omega})$ is as defined in equation (39) and we have assumed the transmit signal $s(t) \leftrightarrow S(\omega)$ to be flat in the frequency region of interest. Processing as in equations (38)-(41), we can focus all these data vectors to a single frequency $\omega_o$ using the focusing matrix $T(\omega_o, \underline{\omega})$ in equation (41). This gives $$Z(\omega_o) = T(\omega_o, \omega)Y(\omega) \simeq P(\omega_o)\underline{q}(i_o, k_o) + \quad (52)$$

$$\sum_i \sum_k \alpha_{ik} P(\omega_o)\underline{q}(i,k)$$

$$\simeq \underline{a}(\omega_o, \phi_{k_o}, \theta_{i_o}) + \sum_i \sum_k \alpha_{ik}\underline{a}(\omega_o, \phi_k, \theta_i).$$

Let $$\underline{c}(\omega_o, n) \leftrightarrow \sum_i \sum_k \alpha_{ik}\underline{a}(\omega_o, \phi_k, \theta_i) \quad (53)$$

represent the focused clutter and interference data vector in equation (52).

Figure 6:
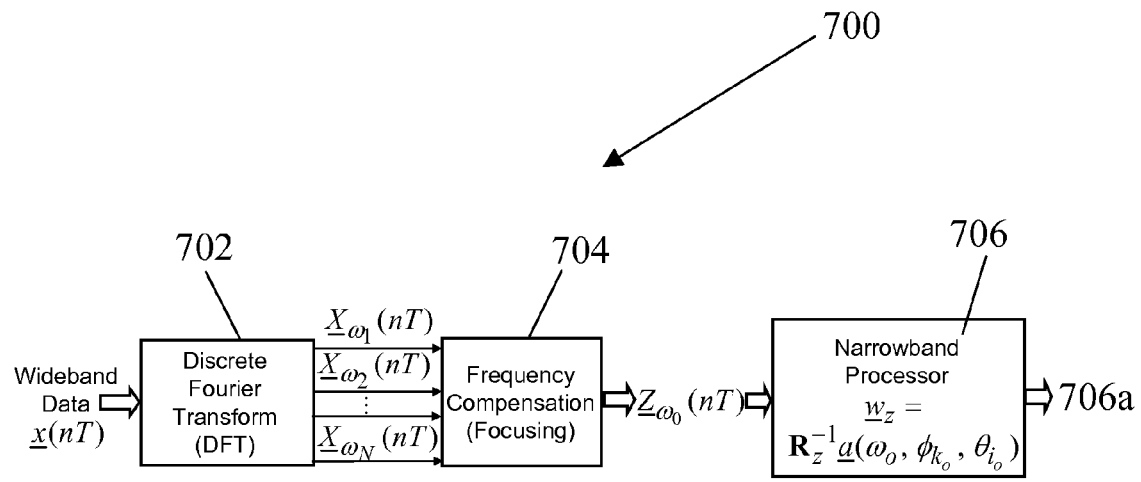
FIG. 6 shows a block diagram of a frequency compensating or focusing method on the circular array data.
Figure 14:
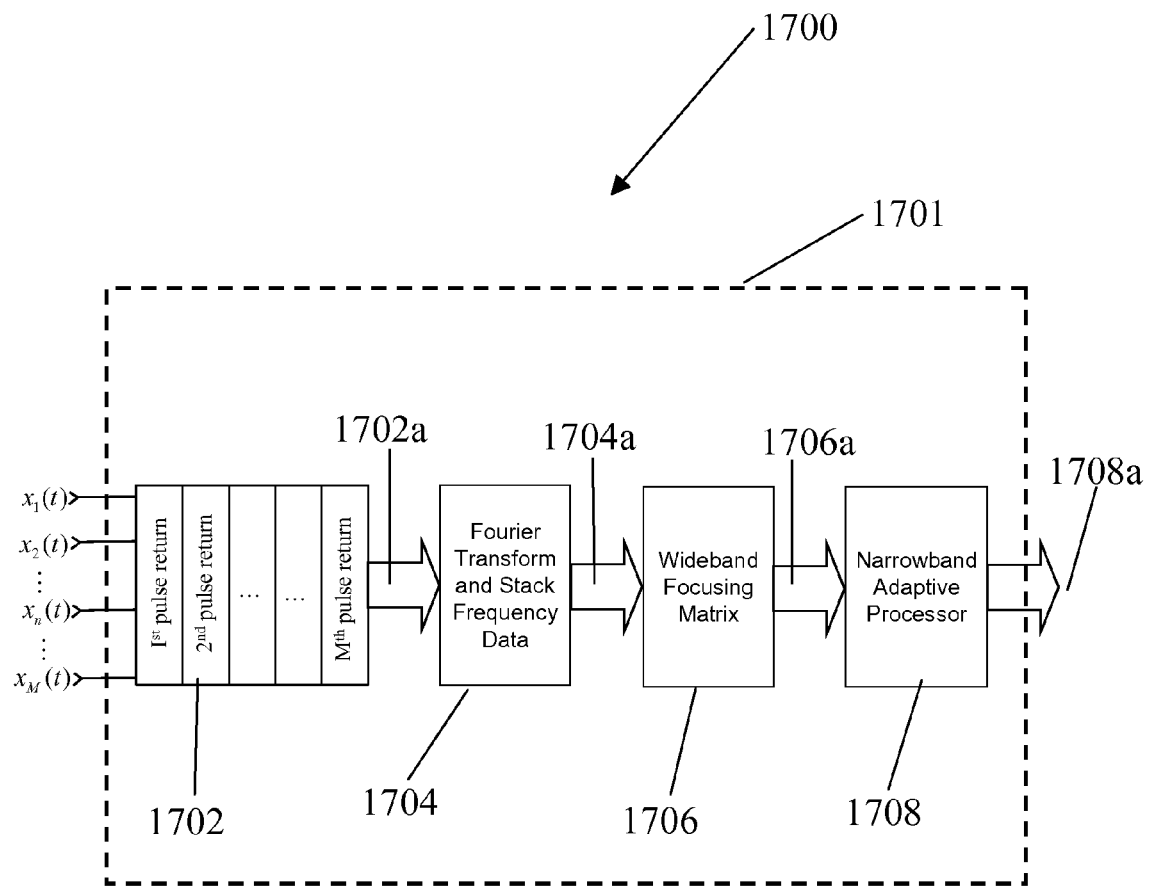
FIG. 14 shows a diagram of an apparatus for use in accordance with an embodiment of the present invention.

FIG. 6 shows a block diagram 700 of a frequency focusing method on circular array wideband data x(nT) output from sensors of FIG. 1 and sent to a computer processor, such as the computer processor 1701 shown in FIG. 14. The computer processor subjects the data to a discrete Fourier transform (DFT) at step 702. The transformed data is then subjected to frequency focusing at step 704 by the computer processor. The data is then subjected to narrowband processing by a narrowband processor 706, which may be implemented by the computer processor also. At output 706a, the target detection test statistic is supplied and can be displayed on a display screen.

In equation (52), both the target data as well as the clutter data has been focused to a single frequency $\omega_o$ using the same frequency focusing matrix $T(\omega_o, \underline{\omega})$, and hence narrowband receiver processing schemes can be applied to equation (52) as shown in FIG. 6.

The optimum narrowband processor for (52) is given by a whitening filter following by the matched filter [J. R. Guerci, Space-Time Adaptive Processing for Radar, Artech House, Boston, 2003]. The optimum filter is given by $$\underline{w}_z = R_z^{-1}\underline{a}(\omega_o, \phi_{k_o}, \theta_{i_o}) \quad (54)$$

where $$R_z = E\{\underline{c}(\omega_o, n)\underline{c}^*(\omega_o, n)\} \quad (55)$$

represents the focused clutter covariance matrix that can be estimated using the neighboring range bins that are adjacent to the target range bin of interest.

The adaptive weight vector in equation (54) is narrowband in nature and it suppresses the undesired clutter and interferences at while detecting the target present at $(\theta_{i_o}, \phi_{k_o})$. Notice that unlike subband based schemes, it is not necessary to perform the adaptive processor in (54) to each subband. Instead, in the present invention, data is refocused to one single frequency band as in (52) using a focusing matrix, and then processed in one step at the final stage as shown in FIG. 6.

Figure 7:
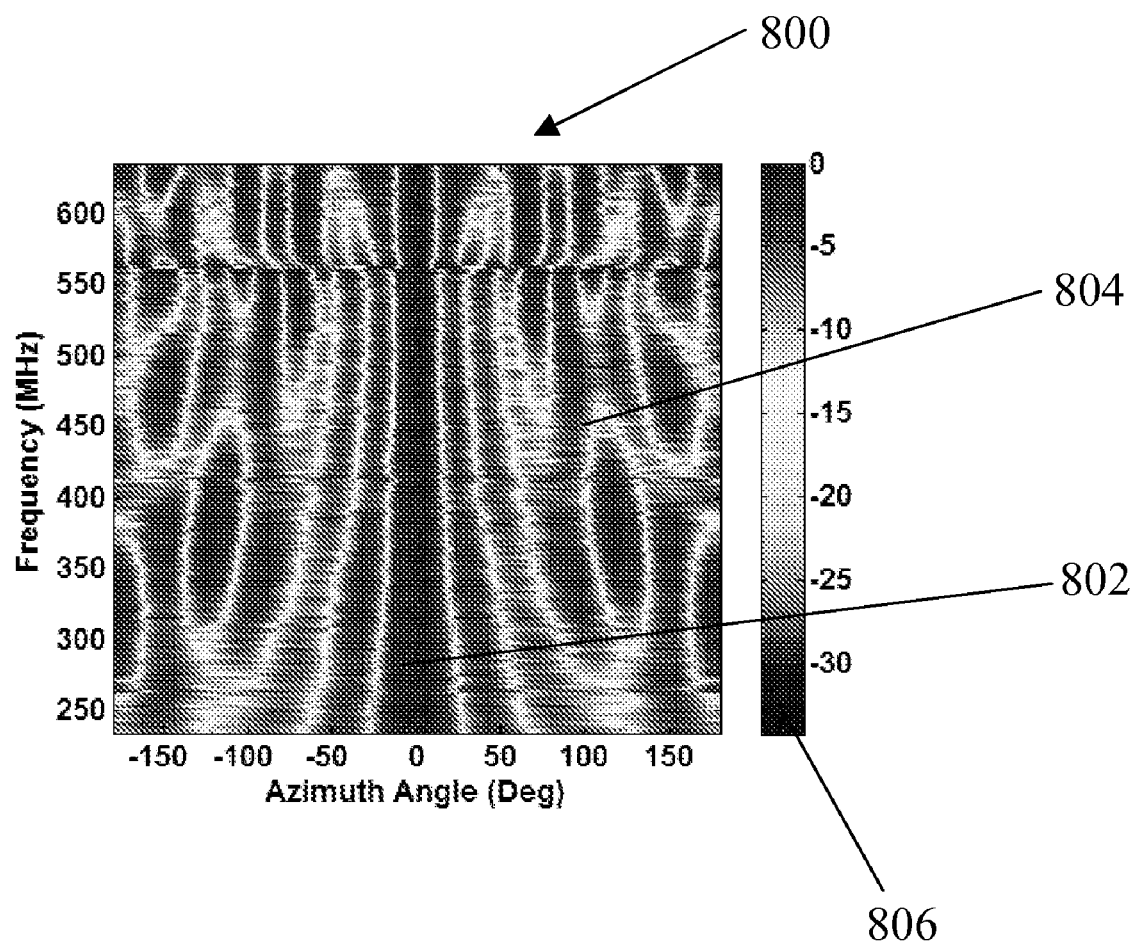
FIG. 7 shows a diagram of an unfocused output signal to interference plus noise ratio output (SINR) as a function of frequency and azimuth angle $\theta$ for a wideband circular array with twelve sensors.

FIG. 7 shows a diagram 800 of an unfocused output signal to noise ratio as a function of frequency and azimuth angle θ for a wideband circular array with twelve sensors.). FIG. 7 shows frequency in MHz on the y axis verus azimuth angle in degrees on the x axis. A wideband signal (235 MHz-635 MHz) is split into 200 frequency bands in the example of FIG. 7. The diagram 800 includes sections 802, 804 and 806. The section 802 shows the frequency dependent mainbeam gain function versus the azimuth angle (in degrees) on the x axis. The section 804 shows the frequency dependent sidelobe gain function versus the azimuth angle (in degrees), and section 806 shows the scaling function used here with lighter region representing lower gain levels in dB (decibels).

FIG. 7 shows the result of traditional processing when SINR output for each sub band data is plotted as a function of the azimuth angle θ. Observe that the mainbeam width is different at different frequencies indicating the frequency sensitivity of the traditional approaches.

Figure 8:
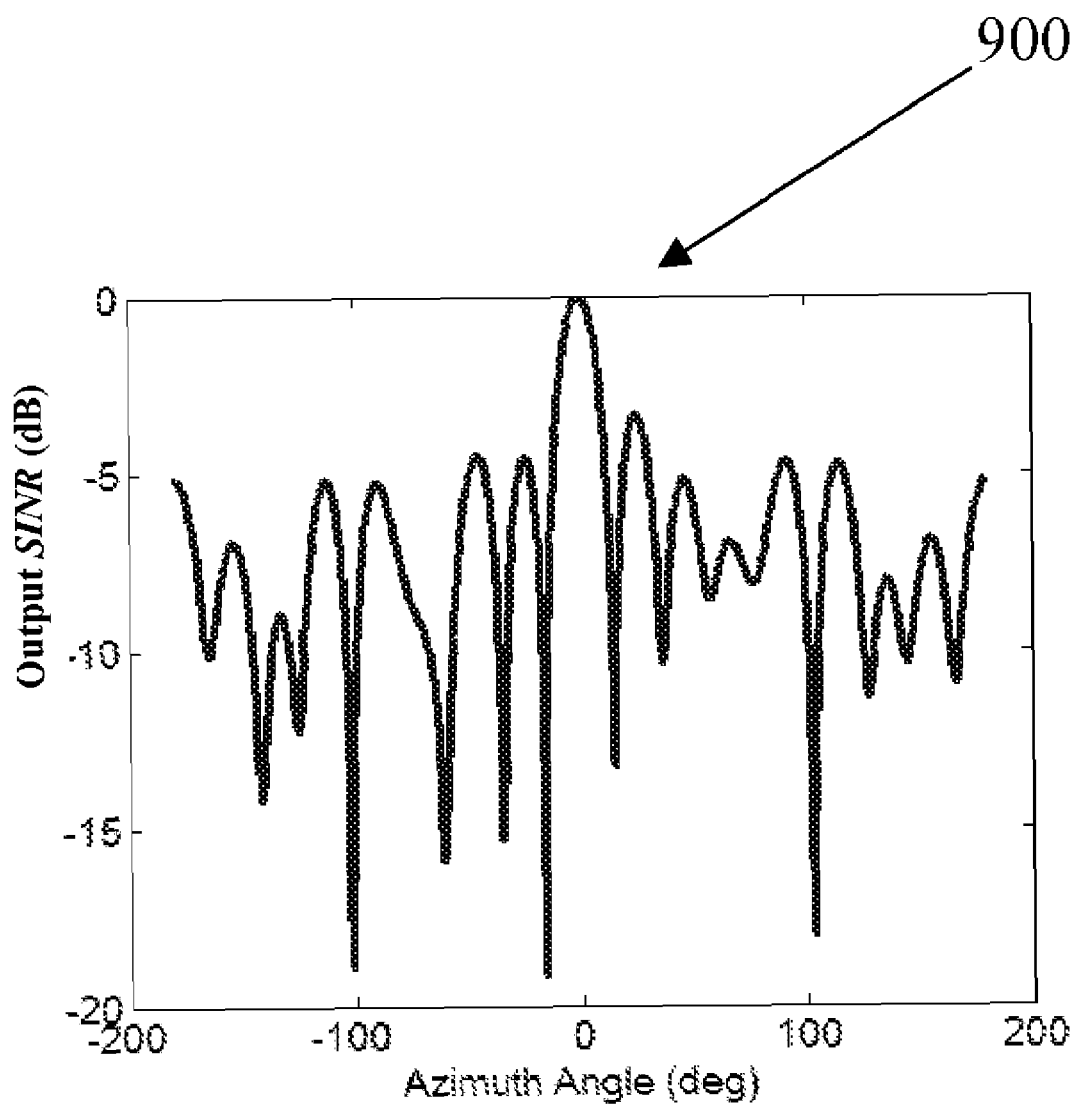
FIG. 8 shows a diagram of a focused output signal to interference plus noise ratio output (SINR) in accordance with one or more embodiments of the present invention as a function of azimuth angle $\theta$ for a wideband circular array such as in FIG. 1 with twelve sensors.

FIG. 8 shows a diagram 900 of focused output signal to interference plus noise ratio as a function (SINR) versus azimuth angle θ for a wideband circular array similar to the circular array or 2 of FIG. 1 using twelve sensors. In the example of FIG. 8, a wideband signal as in FIG. 7 is split into twenty frequency bands. All frequency bands are focused to the frequency of 435 MHz in FIG. 8.

FIG. 8 shows the output signal to interference plus noise (SINR) given by $$SINR = |\underline{w}_z^* \underline{a}(\omega_o, \phi, \theta)|^2 \tag{56}$$

obtained using the focused weight vector in equation (54). In both FIG. 7 and FIG. 8, a twelve sensor circular array is used. Observe that all frequencies have been aligned and only a single mainbeam of constant width is generated at all frequencies. This is unlike the subband processor 802 in FIG. 7, where the mainbeam width is frequency dependent generating a wider null at lower frequency. For comparison purposes, the unfocused output as function of the azimuth angle and frequency is shown in FIG. 7. From there the output 802 in the mainbeam region is sensitive to the frequency band.

Finally, from FIG. 6, as shown in 706, the optimum weight vector $\underline{w}_z$ in (54) acts of the focused data $\underline{z}(\omega_o)$ from the range of interest to generate the threshold detector $$|w_z * z(\omega_o)| \begin{array}{c} H_1 \text{(Target Present)} \\ > \\ < \\ H_o \text{(Target Absent)} \end{array} \eta \tag{57}$$

where $\eta$ represents a specific threshold satisfying a certain false alarm. The test in equation (57) maybe repeated over all range bin of interest to detect the target.

To detect moving targets, the radar array in FIG. 1 transmits a sequence of M pulses and records their returns, thus generating a space-time data vector. A moving target generates a Doppler component. In order to estimate that component, a treatment similar to the above one can be carried out in the Doppler domain. Detailed analysis of clutter data focusing both in space and time, to a single reference frequency and developing efficient algorithms to process the data to detect targets by suppressing clutter are carried out in the next section.

The present invention in one or more embodiments also provides a new method and/or apparatus of wideband space-time adaptive processing (STAP) for a circular array.

To detect moving targets, the above analysis can be extended to the Doppler domain by analyzing the space-time adaptive processing in the wideband case using circular arrays. When multiple pulses—say M of them—are transmitted at a pulse repetition interval $T_r$, depending on the relative velocity of the target with respect to the sensor platform reference direction, different pulse returns are delayed differently at the receiver reference sensor. In the frequency domain, these delays appear as frequency dependent phase delays, and hence at frequency $\omega$, a temporal steering vector $\underline{b}(\omega, \omega_d)$ can be generated.

Assuming V is the platform velocity along the reference direction $\theta_1$ (see FIG. 1) relative with respect to the point of interest at $(\theta, \phi)$, we obtain the temporal steering vector to be [J. R. Guerci, Space-Time Adaptive Processing for Radar, Artech House, Boston, 2003]

$$b(\omega, \omega_d) = \begin{bmatrix} 1 \\ e^{-j\pi\omega_d} \\ \vdots \\ e^{-j\pi(M-1)\omega_d} \end{bmatrix} \tag{58}$$

where the Doppler frequency $\omega_d$ can be shown to be $$\omega_d = \frac{2\omega V T_r}{\pi c} \sin\phi \cos(\theta - \theta_1). \tag{59}$$

If the platform itself is in motion, then every scattering point in the field of view generates a Doppler component according to equation (59) whose value depends on its angular location.

The vector $\underline{X}(\omega) = \underline{X}_1(\omega)$ in equation (14) corresponds to the transform of the spatial array sensor outputs due to the first pulse, and by stacking up the returns due to M consecutive pulses $\underline{X}_k(\omega)$, k=1, 2, ... M, the MN×1 spatio-temporal data vector $$X(\omega) = \begin{bmatrix} X_1(\omega) \\ X_2(\omega) \\ \vdots \\ X_M(\omega) \end{bmatrix} \tag{60}$$

at frequency $\omega$ can be represented as $$X(\omega) = S(\omega)\underline{b}(\omega, \omega_d) \otimes \underline{a}(\omega, \phi, \theta) \tag{61}$$

where $S(\omega)$ and $\underline{a}(\omega, \phi, \theta)$ are as defined in equation (14) and $\underline{b}(\omega, \omega_d)$ represents the temporal steering vector in (58). Here $\otimes$ represents the Kronecker product defined in equation (33).

Proceeding as in equations (14)-(39), the temporal steering vector also can be synthesized as (details omitted)

$$\underline{b}(\omega, \omega_d) = C(\omega)\underline{s}_1 \odot D(\omega)\underline{s}_2 = (C^T(\omega) \odot D^T(\omega))^T$$
$$(\underline{s}_1 \otimes \underline{s}_2) = Q(\omega)(\underline{s}_1 \otimes \underline{s}_2) \tag{62}$$

where $C(\omega)$ and $D(\omega)$ are two M×(2L+1) matrices whose (i, k)$^{th}$ elements are given by $$C_{ik}(\omega) = J_k((i-1)\gamma(\omega))e^{jk\theta_1}, \quad i = 1 \to M, \quad k = -L \to L \tag{63}$$

and $$D_{ik}(\omega) = J_k((i-1)\gamma(\omega))e^{-jk\theta_1}, \quad i = 1 \to M, \quad k = -L \to L \tag{64}$$

where $$\gamma(\omega) = \frac{\omega V T_r}{c}. \tag{65}$$

In equation (12), $$Q(\omega) = (C^T(\omega) \odot D^T(\omega))^T \tag{66}$$

where $\odot$ represents the Khatri-Rao product as in (33), and $\underline{s}_1$ and $\underline{s}_2$ are as defined in equation (32). $Q(\omega)$ is of size M×(2L+1)$^2$. In equation (62), the temporal steering vector has been synthesized as a product of a frequency dependent part $Q(\omega)$ and a frequency insensitive part $\underline{s}_1 \otimes \underline{s}_2$.

Substituting equation (37) and equation (62) into (61) we get the frequency-dependent space-time steering vector $$b(\omega, \omega_d) \otimes a(\omega, \omega_d) = Q(\omega)(s_1 \otimes s_2) \otimes P(\omega)(s_1 \otimes s_2) \tag{67}$$
$$= (Q(\omega) \otimes P(\omega))(s_1 \otimes s_2) \otimes (s_1 \otimes s_2)$$
$$= K(\omega)u$$

-continued $$= b(\omega_o, \omega_{d_o}) \otimes a(\omega_o, \phi_{k_o}, \theta_{i_o}) +$$
$$\sum_i \sum_k \alpha_{ik} b(\omega_o, \omega_{d_{ik}}) \otimes a(\omega_o, \phi_k, \theta_i)$$
$$= b(\omega_o, \omega_{d_o}) \otimes a(\omega_o, \phi_{k_o}, \theta_{i_o}) + c(\omega_o).$$

In rank deficient situations, the matrix inversion in equation (74) is to be interpreted as a pseudo-matrix inversion. Alternatively, in (74), the inversion of $G^*(\omega)G(\underline{\omega})$ can be accomplished by adding a diagonal term $\epsilon I$ with $\epsilon > 0$ to it so that $G^*(\omega)G(\underline{\omega})+\epsilon I$ is full rank and invertible. Observe that the focusing matrix in (74) is valid for returns from all locations.

Since $G^*(\omega)G(\underline{\omega})$ is of size $(2L+1)^4 \times (2L+1)^4$, its size can be prohibitive in carrying out the above inversion. In that case, the useful inversion identity $$(G^*(\omega)G(\omega) + \varepsilon I)^{-1} = \frac{1}{\varepsilon}[I - G^*(\omega)(G(\omega)G^*(\omega) + \varepsilon I)^{-1}G(\omega)] \quad (76)$$

can be employed. Observe that the matrix inversion in (76) only involves a smaller matrix of dimension MNK×MNK matrix. This gives the frequency focusing operator $T(\omega_o, \underline{\omega})$ in (74) to be $$T(\omega_o, \underline{\omega}) = K(\omega_o)G^*(\underline{\omega}) - K(\omega_o)G^*(\underline{\omega})(G(\omega)G^* \\ (\underline{\omega}) + \epsilon I)^{-1}G(\underline{\omega})G^*(\omega). \quad (77)$$

Define $$A_1 = K(\omega_o)G^*(\underline{\omega}), \quad (78)$$

$$A_2 = G(\underline{\omega})G^*(\omega), \quad (79)$$

and $$A_3 = (A_2 = \epsilon I)^{-1}. \quad (80)$$

Here $A_1$ is of size MN×MNK, $A_2$ and $A_3$ are of size MNK×MNK, and hence $T(\omega_o, \underline{\omega})$ in (74) can be efficiently implemented as $$T(\omega_o, \underline{\omega}) = A_1(I - A_3 A_2). \quad (81)$$

Observe that equation (79) involves only smaller size matrix multiplications compared to direct implementation of (72), and moreover their entries are data independent. As a result, it can be implemented efficiently prior to actual data collection.

Finally, narrowband STAP processing methods similar to equations (54)-(55) can be applied to equation (75) for final processing. In this manner, the frequency focusing method can be extended into the space-time adaptive processing as well.

To be specific, with $$R = E\{c(\omega_o)c^*(\omega_o)\} \quad (82)$$

where $c(\omega_o)$ represents the clutter data is as in (75), we have $$w = R^{-1}s(\omega_o, \omega_{d_o}, \phi_{k_o}, \theta_{i_o}) \quad (83)$$

with $$s(\omega_o, \omega_{d_o}, \phi_{k_o}, \theta_{i_o}) = \underline{b}(\omega_o, \omega_{d_o}) \otimes \underline{a}(\omega_o, \phi_{k_o}, \theta_{i_o}) \quad (84)$$

where $$K(\omega) = Q(\omega) \otimes P(\omega) \quad (68)$$

and $$u = (s_1 \otimes s_2) \otimes (s_1 \otimes s_2). \quad (69)$$

Hence $K(\omega)$ is of size $MN \times (2L+1)^4$ and $\underline{u}$ is of size $(2L+1)^4 \times 1$. In (67), we have used another well known Kronecker product identify given by $$AB \otimes CD = (A \otimes C)(B \otimes D)$$

with $A = Q(\omega)$, $B = D = \underline{s}_1 \otimes \underline{s}_2$, and $C = P(\omega)$. (70)

Once again, the frequency dependent space-time steering vector $\underline{b}(\omega, \omega_d) \otimes \underline{a}(\omega, \omega_d)$ in equation (67) has been synthesized as a product of a frequency dependent part $K(\omega)$ in (68) and a frequency-independent part $\underline{u}$ in equation (69).

In the final step, the above synthesis procedure allows focusing all frequency components into a single frequency slot using the procedure described in equations (44)-(52). Observe that as before returns from all scatter point can be refocused simultaneously in the space-time scene as well.

Following equations (46) and (61), the transform of the general space-time data vector takes the form:

$$X(\omega) = b(\omega, \omega_{d_o}) \otimes a(\omega, \phi_{k_o}, \theta_{i_o}) + \quad (71)$$
$$\sum_i \sum_k \alpha_{ik} b(\omega, \omega_{d_{ik}}) \otimes a(\omega, \phi_k, \theta_i)$$
$$= K(\omega)u(i_o, k_o) + \sum_i \sum_k \alpha_{ik} K(\omega)u(i, k)$$

and stacking up various frequency components as in equation (51) the following is determined:

$$Y(\omega) = \begin{pmatrix} X(\omega_1) \\ X(\omega_2) \\ \vdots \\ X(\omega_K) \end{pmatrix} = \underbrace{\begin{pmatrix} K(\omega_1) \\ K(\omega_2) \\ \vdots \\ K(\omega_K) \end{pmatrix}}_{G(\omega)} \left( u(i_o, k_o) + \sum_i \sum_k \alpha_{ik} u(i, k) \right) \quad (72)$$

where $$G(\omega) = \begin{pmatrix} K(\omega_1) \\ K(\omega_2) \\ \vdots \\ K(\omega_K) \end{pmatrix} \quad (73)$$

is of size $MNK \times (2L+1)^4$. Following equation (40), define $$T(\omega_o, \underline{\omega}) = K(\omega_o)(G^*(\omega)G(\underline{\omega}))^{-1}G^*(\underline{\omega}) \quad (74)$$

and apply that to (72) to obtain the frequency focused data $$Z(\omega_o) = T(\omega_o, \omega)Y(\omega) = K(\omega_o)\left( u(i_o, k_o) + \sum_i \sum_k \alpha_{ik} u(i, k) \right) \quad (75)$$

represents the optimum narrowband processor. The focused data from each range bin may be processed as in equation (57) to detect targets.

Figures 9A, 9B:
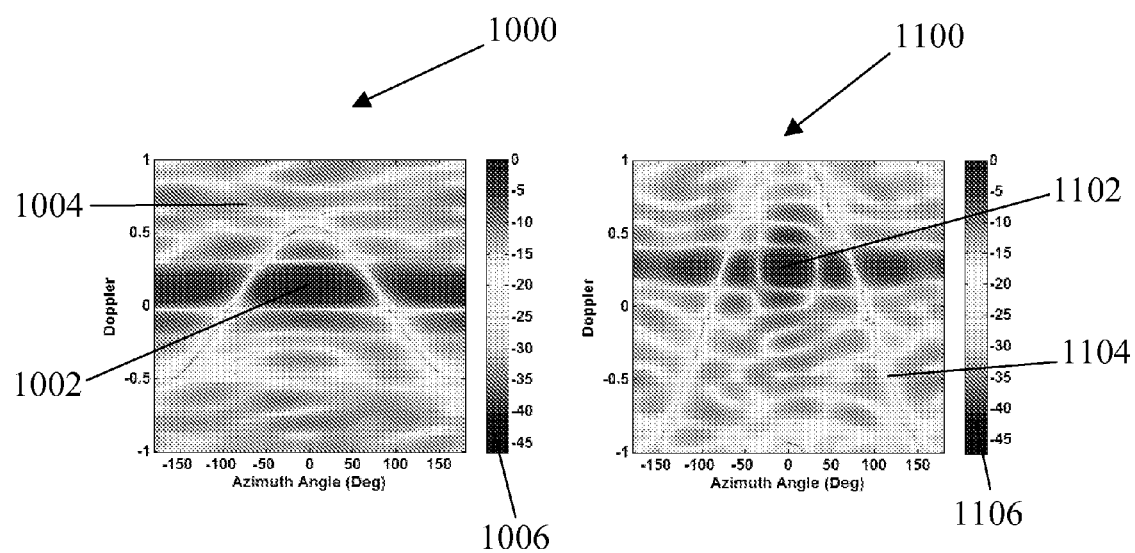
FIG. 9A shows a diagram of an unfocused signal to interference plus noise ratio output (SINR) in the joint azimuth-Doppler domain at a first frequency subband for a wideband circular array such as in FIG. 1 with twelve sensors and fourteen pulses. Injected target located at zero azimuth angle and ninety degree elevation angle is moving with velocity of twenty-five meters/second.
FIG. 9B shows a diagram of an unfocused signal to interference plus noise ratio output (SINR) in the joint azimuth-Doppler domain at a second frequency subband for a wideband circular array with twelve sensors and fourteen pulses. Injected target located at zero azimuth angle and ninety degree elevation angle is moving with velocity of twenty-five meters/second.

FIG. 9A shows a diagram 1000 of an unfocused azimuth Doppler output signal to noise ratio (SINR) at a first frequency subband for a wideband circular array such as array or element 2 in FIG. 1 with twelve sensors and fourteen pulses. A wideband data set (100 MHz-200 MHz) is split into multiple subbands of bandwidth 4 MHz here. A first subband output is shown in FIG. 9A and a second subband output is shown in FIG. 9B. Injected target located at zero azimuth angle and ninety degree elevation angle is moving with velocity of twenty-five meters/second and it appears at different Dopplers at different frequencies (sections 1002 and 1102). Clutter to noise ratio is 40 dB. The diagram 1000 includes section 1002 which shows the peak due to the injected target, section 1004 that shows the nulled out sidelobe characteristics, and section 1006 that shows the scaling function used here with lighter region representing lower gain levels in dB (decibels).

FIG. 9B shows a diagram 1100 of an unfocused azimuth Doppler output signal to noise ratio (SINR) at a second frequency subband for a wideband circular array, such as array or element 2 in FIG. 1 with twelve sensors and fourteen pulses. A second subband output is shown in FIG. 9B. The diagram 1100 includes section 1102 which shows the peak due to the injected target, section 1104 that shows the nulled out sidelobe characteristics and section 1106 that shows the scaling function used here with lighter region representing lower gain levels in dB (decibels).

Figure 10:
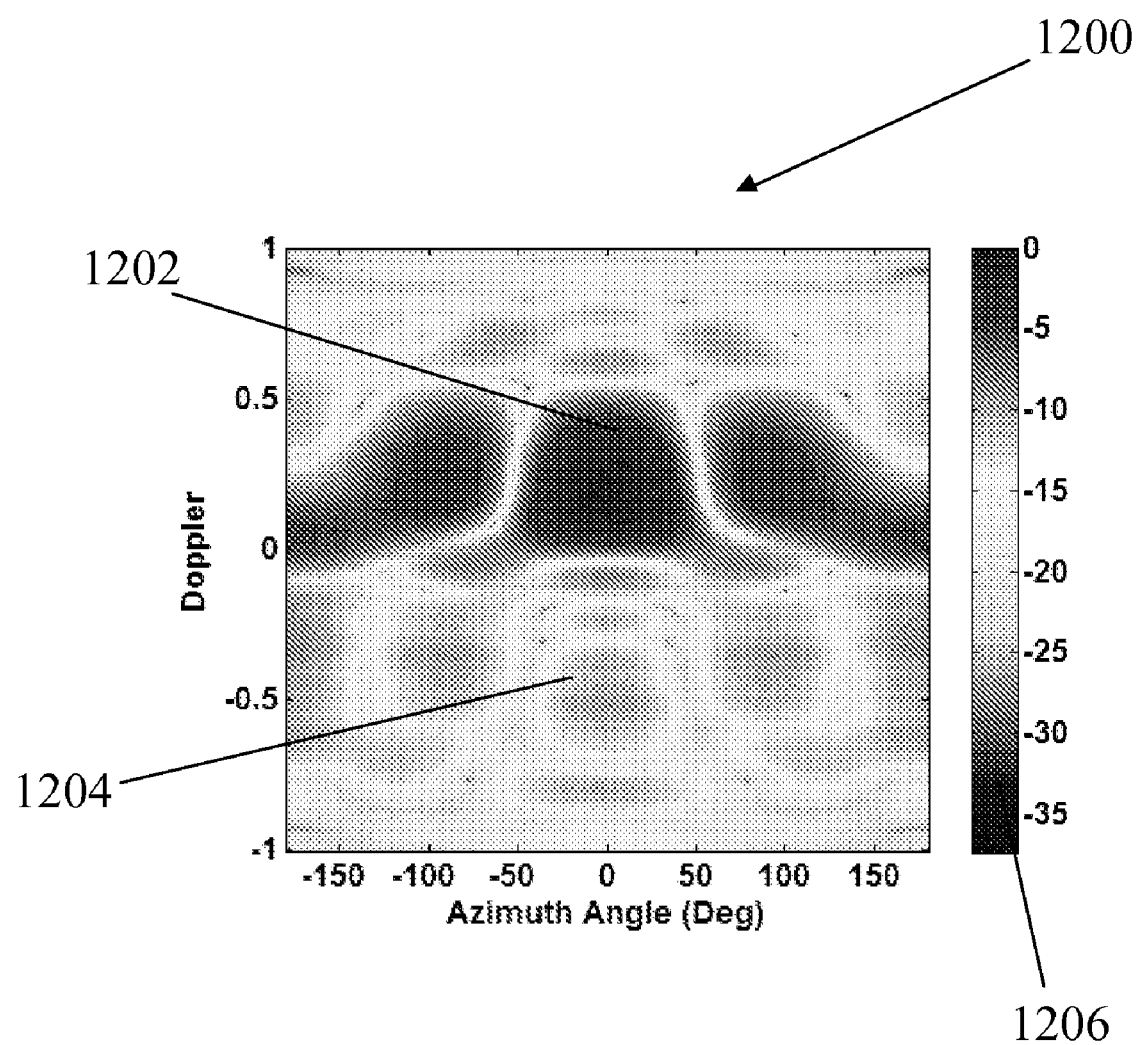
FIG. 10 shows a diagram of the focused output SINR in the joint azimuth-Doppler domain in accordance with one or more embodiments of the present invention for a wideband circular array such as in FIG. 1 using twelve sensors and fourteen pulses. Injected target located at zero azimuth angle and ninety degree elevation angle is moving with velocity of twenty-five meters/second.

FIGS. 9A and 9B show the unfocused azimuth-Doppler output $SINR_i$ pattern for the $i^{th}$ subband for two different frequency bands (first and last) where the wideband data corresponds to a 100 MHz bandwidth (100 MHz to 200 MHz). Here $$SINR_i = |w_i^* \ast s(\omega_i, \omega_d, \phi_{k_o}, \theta)|^2 \quad (85)$$

where $w_i$ represents the optimum weight vector for the $i^{th}$ subband. As mentioned above, the injected target located at zero azimuth angle and elevation angle equal to 90° is moving with a velocity of 25 m/sec, and it appears at different Doppler frequencies in different subbands. From there, the detected target parameters are frequency sensitive. The circular array has twelve sensors and uses fourteen pulses to generate the data over a wide bandwidth of 100 MHz that span from 100 MHz to 200 MHz. The SINR pattern of the focused beam given by $$SINR = |w^* s(\omega_o, \omega_{d_o}, \phi_{k_o}, \theta_{i_o})|^2 \quad (86)$$

using equations (82)-(83) is shown in FIG. 10. In this case, for illustration purposes the two extreme frequency bands located at frequencies of 100 MHz and 200 MHz are refocused to their center frequency of the data set (150 MHz) using only seven Bessel function components (L=7 in (63)-(64)). Observe that the target is visible at the correct azimuth and Doppler location.

FIG. 10 shows a diagram 1200 of a focused azimuth-Doppler output SINR for a wideband circular array using twelve sensors and fourteen pulses. The diagram 1200 includes section 1202, section 1204 and section 1206. Section 1202 shows the SINR peak due to the injected target, section 1204 shows the nulled out sidelobe characteristics, and section 1206 that shows the scaling function used here with the lighter region representing lower gain levels in dB (decibels). In the example of FIG. 10, a space-time data vector such as in equation (72) corresponding to frequencies 100 MHz and 200 MHz from a wideband signal is focused to the center frequency of 150 MHz using fifteen Bessel coefficient terms (L=7) such as in equations (29)-(30). Injected target located at zero azimuth angle and ninety degrees elevation angle is moving with velocity twenty-five meters/second that corresponds to a normalized Doppler frequency of 0.2 at 150 MHz. Clutter to noise ratio is forty decibels.

Figure 11:
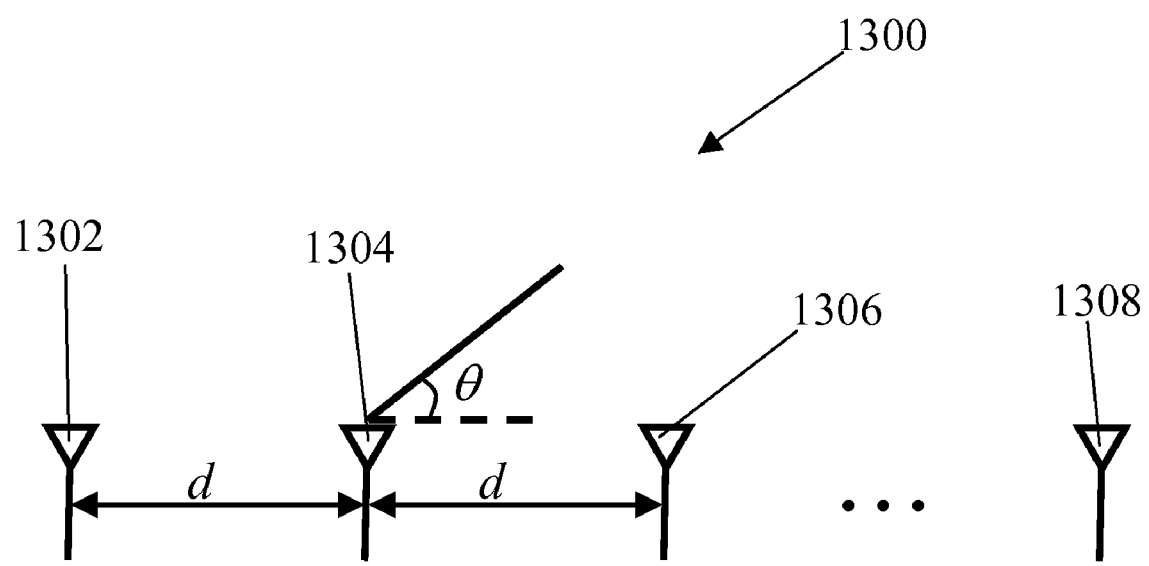
FIG. 11 shows a diagram of a linear array apparatus in accordance with an embodiment of the present invention.

Wideband Linear Array:

The above analysis can be easily extended to the linear array case as shown in FIG. 11 with a an apparatus 1300. In this case the linear array apparatus 1300 and geometry can be substituted to compute the corresponding delays in equation (9) and the rest of the procedure for frequency focusing is the same as outlined above. For example, for an N element uniformly placed linear array with normalized inter-element spacing equal to d and a first sensor 1302 located as shown, a second sensor 1304 located as shown, a third sensor 1306, located as shown, and any number of further sensors, up to an N-th sensor 1308. With the last sensor 1308 as shown in the apparatus 1300, the time delay for the $n^{th}$ sensor is computed to be $$\tau_n = \frac{(n-1)d}{c} \cos\theta \sin\phi, \, n = 1, 2, \ldots, N. \quad (87)$$

where $\theta$ and $\phi$ represent the azimuth and elevation angles respectively, and n can be any integer such as n=1, 2, ..., N. Equation (87) can be substituted into equations (12)-(86) and simplified accordingly to obtain the corresponding linear array results. In this case proceeding as in (17)-(32) the quantities $A_{n,k}(\omega)$, $B_{n,k}(\omega)$ defined in (24), (26) takes the form $$A_{n,k}(\omega) = J_k((n-1)\beta(\omega)), \quad (89)$$
$$n = 1, 2, \ldots N, k = -L, -(L-1), \ldots 0, 1, \ldots, L,$$

$$B_{n,k}(\omega) = (-i)^k J_k((n-1)\beta(\omega)), \quad (90)$$
$$n = 1, 2, \ldots, N, k = -L, -(L-1), \ldots 0, 1, \ldots, L,$$

with $$\beta(\omega) = \frac{\omega d}{2c} \quad (91)$$

and proceeding as in (58)-(65) the quantities $C_{n,k}(\omega)$, and $D_{n,k}(\omega)$ defined in (63) and (64) takes the form $$C_{ik}(\omega) = J_k((i-1)\gamma(\omega)), \quad (92)$$
$$i = 1, 2, \ldots, M, k = -L, -(L-1), \ldots 0, 1, \ldots, L,$$

and $$D_{ik}(\omega) = (-i)^k J_k((i-1)\gamma(\omega)), \quad (93)$$
$$i = 1, 2, \ldots, M, k = -L, -(L-1), \ldots 0, 1, \ldots, L,$$

with $$\gamma(\omega) = \frac{\omega V T_r}{c} \quad (94)$$

where $J_k(\beta)$ represents the Bessel function of the $k^{th}$ order elevated at $\beta$ as defined in (22). The rest of the procedure remains the same as in the circular array case.

FIGS. 12A and FIG. 12B show diagrams 1400 and 1500 that are focused azimuth-Doppler output SINR for a linear circular array using fourteen sensors and sixteen pulses. Diagram 1400 refers to the top view and diagram 1500 refers to the side view. The diagram 1400 includes a section 1402, a section 1404, and a second 1406. The section 1402 shows the SINR peak due to the injected target, section 1404 shows the nulled out sidelobe characteristics and section 1406 shows the scaling function used here with the lighter region representing lower gain levels in dB (decibels). Similarly, the diagram 1500 includes a section 1502, a section 1504, and a section 1506. The section 1502 shows the SINR peak due to an injected target, section 1504 shows the nulled out sidelobe characteristics and section 1506 shows the scaling function used here with lighter region representing lower gain levels in dB (decibels). In the examples of FIGS. 12A and FIG. 12B, a space-time data vector such as in equation (72) corresponding to frequencies 335 MHz to 535 MHz is focused to the center frequency of 435 MHz using twenty frequency bands. Fifteen Bessel coefficient terms (L=15) such as in equations (29)-(30) are used for frequency focusing here. Injected target located at zero azimuth angle and ninety degrees elevation angle is moving with velocity 40 meters/second. Clutter to noise ratio is 40 decibels.

Figure 13:
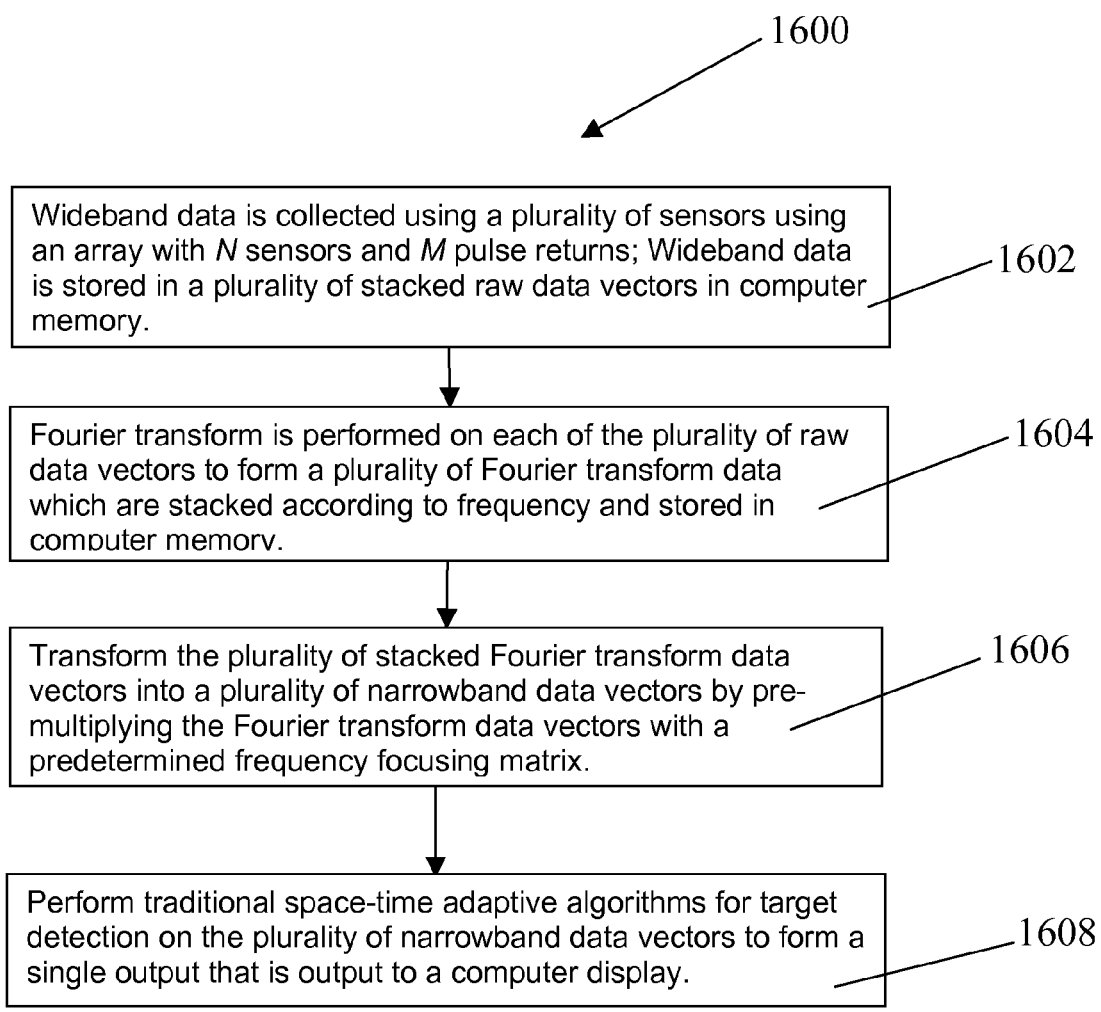
FIG. 13 shows a diagram of a flowchart of a method in accordance with an embodiment of the present invention.

FIG. 13 shows a flowchart 1600 of a method in accordance with an embodiment of the present invention. FIG. 14 shows an apparatus 1700 which can be used in accordance with the method of the flow chart of FIG. 13. The apparatus 1700 includes a computer processor 1701, shown in dashed lines. The computer processor 1700 may include or may be thought of as including modules 1702, 1704, 1706, and 1708, each of which may have computer memory.

The method of FIG. 13 includes step 1602 in which wideband data, such as x1(t), x2(t), . . . shown in FIG. 14, is collected by a plurality of sensors, such as sensors 4a-4N in FIG. 1, using a circular array or element such as circular array or element 2, with N sensors and M pulse returns, or using a linear array as shown in FIG. 11 with a plurality of sensors such as 1302, 1304, . . . The wideband data is supplied from the sensors to a computer processor, such as computer processor 1701, such as to module 1702 of computer processor 1701, shown in FIG. 14. The wideband data is then stored by the computer processor 1701 in a plurality of stacked raw data vectors in computer memory of computer processor 1701, in module 1702 shown in FIG. 14. Each of the plurality of raw data vectors corresponds to one of the M pulse returns. The raw data vectors are generally stacked with the last raw data vector corresponding to the last pulse in time being the first to be output via output 1702a of the module 1702.

The method show in FIG. 13, further includes step 1604 in which a Fourier transform is performed on each of the plurality of raw data vectors to form a plurality of Fourier transform data vectors. The method may be implemented by module 1704 shown in FIG. 14 in computer processor 1701. At step 1606 of FIG. 13, the computer processor 1701 in module 1706 may transform the plurality of Fourier transform data vectors into a narrowband data vector by premultiplying the Fourier transform data vectors with a predetermined frequency compensating or focusing matrix.

At step 1608, module 1708 of the a computer processor 1701 may perform traditional space time adaptive methods for target detection on the narrowband data vector to form an output data vector supplied at output 1710.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

We claim:

1. A method comprising
transmitting a plurality of pulse transmission signals;
receiving a plurality of received signals at a corresponding plurality of sensors, the plurality of sensors arranged in an array;
using the plurality of received signals to determine a combination received signal;
wherein the combination received signal has a wideband frequency spectrum and the combination received signal includes interference, noise, and at least one return due to one or more of the plurality of pulse transmission signals from at least one target;
wherein each of the plurality of received signals has contributions from scatter returns from a plurality of arrival angles in a field of view of each sensor of the plurality of sensors and contributions due to each pulse transmission signal of the plurality of pulse transmission signals;
wherein the combination received signal includes a plurality of pulse return signals corresponding to the plurality of pulse transmission signals;
further comprising stacking the plurality of pulse return signals in a computer memory as a plurality of raw data vectors;
further comprising performing a Fourier transform on the plurality of raw data vectors to transform the plurality of raw data vectors into a plurality of Fourier transform vectors associated with a corresponding plurality of frequencies and stacking the plurality of Fourier transform vectors in a computer memory to form a stacked Fourier transform vector;
transforming the stacked Fourier transform vector into a narrow band data vector by multiplying the stacked Fourier transform vector with a predetermined frequency compensating matrix;
performing a traditional space-time adaptive method for target detection on the narrowband data vector to form a plurality of outputs.

2. The method of claim 1 wherein
wherein the traditional space-time adaptive method includes supplying the narrowband data vector to a whitening filter and then to a matched filter to form the plurality of outputs.

3. The method of claim 1 wherein
the plurality of outputs correspond to a plurality of azimuth and elevation angle pairs,
and further comprising detecting a peak output of the plurality of outputs and selecting the azimuth and elevation angle pair corresponding to the peak output.

4. The method of claim 1 further comprising
displaying the peak output and the azimuth and elevation angle pair corresponding to the peak output on a computer display.

5. The method of claim 1 wherein
the array of a plurality of sensors is a circular array of a plurality of sensors.

6. The method of claim 1 wherein
the array of a plurality of sensors is a linear array of a plurality of sensors.

7. The method of claim 1 wherein
each of the Fourier transform vectors includes a frequency dependent portion and a frequency independent portion;
and further comprising storing a set of compensating frequency dependent factors in a matrix form as a compensating matrix for the plurality of frequencies, and stacking a plurality of the compensating matrices in a computer memory and pre-multiplying them with their pseudo-inverses to form and a predetermined frequency compensating matrix;

wherein the predetermined frequency compensating matrix is applied to the stacked Fourier transform vector to focus the frequency dependent portions of the Fourier transform vectors; and wherein each compensating matrix involves one or more Bessel function dependent terms.

8. The method of claim 7 further comprising evaluating each of the one or more Bessel function dependent terms based on a frequency of the plurality of pulse transmission signals.

9. The method of claim 7 wherein each of the plurality of sensors has a first geometry; and further comprising evaluating each of the one or more Bessel function dependent terms based on the first geometry.

10. The method of claim 7 wherein the plurality of sensors are attached to a platform which moves with a platform velocity;

and further comprising evaluating each of the one or more Bessel function dependent terms based on the platform velocity.

11. The method of claim 7 wherein the plurality of pulse transmission signals have a pulse repetition rate;

and further comprising evaluating each of the one or more Bessel function dependent terms based on the pulse repetition rate.

12. The method of claim 5 wherein each of the Fourier transform vectors is given by $$X(\omega_i) = \begin{bmatrix} X_1(\omega_i) \\ X_2(\omega_i) \\ \vdots \\ X_M(\omega_i) \end{bmatrix},$$

where $\underline{X}_1(\omega_i), \underline{X}_2(\omega_i), \ldots$ represent Fourier transforms of a first pulse return signal, a second pulse return signal ..., and an M-th pulse return signal of the plurality of pulse return signals, each of the plurality of pulse return signals evaluated at frequencies $[\omega_1, \omega_2, \ldots \omega_i, \ldots \omega_k]$ for the circular array with N sensors, wherein the predetermined frequency compensating matrix denoted as $T(\omega_o, \underline{\omega})$, acts on the stacked Fourier transform vector given by $$Y(\omega) = \begin{pmatrix} X(\omega_1) \\ X(\omega_2) \\ \vdots \\ X(\omega_K) \end{pmatrix}$$

and the predetermined-frequency compensating matrix is given by:

$$T(\omega_o, \underline{\omega}) = K(\omega_o)G^*(\underline{\omega}) - K(\omega_o)G^*(\underline{\omega})(G(\underline{\omega})G^*(\underline{\omega}) + \epsilon I)^{-1}G(\underline{\omega})G^*(\underline{\omega}),$$

wherein the predetermined frequency compensating matrix generates the narrowband data vector which is given by $Z(\omega_o) = T(\omega_o, \underline{\omega})Y(\underline{\omega})$, wherein $\underline{\omega} = [\omega_1, \omega_2, \ldots \omega_K]$ represents the set of frequencies that are being compensated to the frequency $\omega_o$, and $$K(\omega) = Q(\omega) \otimes P(\omega),$$

$$Q(\omega) = (C^T(\omega) \odot D^T(\omega))^T,$$

$$P(\omega) = (A^T(\omega) \odot B^T(\omega))^T,$$

$$A(\omega) = \begin{pmatrix} A_{1,-L}(\omega) & A_{1,-(L-1)}(\omega) & \ldots & A_{1L}(\omega) \\ A_{2,-L}(\omega) & A_{2,-(L-1)}(\omega) & \ldots & A_{2L}(\omega) \\ \vdots & \vdots & \ddots & \vdots \\ A_{N,-L}(\omega) & A_{N,-(L-1)}(\omega) & \ldots & A_{NL}(\omega) \end{pmatrix},$$

$$B(\omega) = \begin{pmatrix} B_{1,-L}(\omega) & B_{1,-(L-1)}(\omega) & \ldots & B_{1L}(\omega) \\ B_{2,-L}(\omega) & B_{2,-(L-1)}(\omega) & \ldots & B_{2L}(\omega) \\ \vdots & \vdots & \ddots & \vdots \\ B_{N,-L}(\omega) & B_{N,-(L-1)}(\omega) & \ldots & B_{NL}(\omega) \end{pmatrix},$$

$$A_{n,k}(\omega) = J_k(\beta(\omega))e^{jk\theta_n},$$

$n = 1, 2, \ldots, N, k = -L, -(L-1), \ldots 0, 1, \ldots, L,$ $$B_{n,k}(\omega) = J_k(\beta(\omega))e^{-jk\theta_n},$$

$n = 1, 2, \ldots, N, k = -L, -(L-1), \ldots 0, 1, \ldots, L,$ $$C_{ik}(\omega) = J_k((i-1)\gamma(\omega))e^{jk\theta_1},$$

$i = 1, 2, \ldots, M, k = -L, -(L-1), \ldots 0, 1, \ldots, L,$ and $$D_{ik}(\omega) = J_k((i-1)\gamma(\omega))e^{-jk\theta_1},$$

$i = 1, 2, \ldots, M, k = -L, -(L-1), \ldots 0, 1, \ldots, L,$ where for a circular array $$\beta(\omega) = \frac{\omega d}{2c}, \gamma(\omega) = \frac{\omega V T_r}{c}$$

where $J_k(\beta)$ represents the Bessel function of the $k^{th}$ order elevated at $\beta$ given by $$J_k(\beta) = \frac{1}{2\pi}\int_{-\pi}^{\pi} e^{-j(\beta\sin\psi - k\psi)}d\psi = \frac{1}{\pi}\int_0^{\pi}\cos(\beta\sin\psi - k\psi)d\psi,$$

$$J_{-k}(\beta) = (-i)^k J_k(\beta)$$

and $$G(\omega) = \begin{pmatrix} K(\omega_1) \\ K(\omega_2) \\ \vdots \\ K(\omega_K) \end{pmatrix}$$

wherein K represents the number of distinct frequency subbands in the plurality of Fourier transform vectors and L the number of Bessel function terms to be used;

wherein r represents the circular array radius, V the platform velocity, $T_r$ a pulse repetition interval of the plurality of pulse transmission signals, and c the velocity of light;

and wherein $\odot$ represents the Khatri-Rao product and $\otimes$ represents the Kronecker product operations between two matrices respectively.

13. The method of claim 6 wherein each of the Fourier transform vectors is given by $$X(\omega) = \begin{bmatrix} X_1(\omega) \\ X_2(\omega) \\ \vdots \\ X_M(\omega) \end{bmatrix},$$

where $\underline{X}_1(\omega)$, $\underline{X}_2(\omega)$, . . . represent the transforms of the first pulse return signal, the second pulse return signal . . . , the M-th pulse return signal . . . , evaluated at frequency $\omega$ for a linear array with N sensors, wherein the predetermined frequency compensating matrix is given by $T(\omega_o, \underline{\omega})$, and the predetermined frequency compensating matrix acts on the stacked Fourier transform vector given by $$Y(\underline{\omega}) = \begin{pmatrix} X(\omega_1) \\ X(\omega_2) \\ \vdots \\ X(\omega_K) \end{pmatrix}$$

and wherein the predetermined frequency compensating matrix is given by $T(\omega_o, \underline{\omega}) = K(\omega_o)G^*(\underline{\omega}) - K(\omega_o)G^*(\underline{\omega})(G(\omega)G^*(\underline{\omega}) + \epsilon I)^{-1}G(\underline{\omega})G^*(\omega),$ wherein the predetermined frequency compensating matrix generates by a frequency focusing process the narrowband data vector, given by $Z(\omega_o) = T(\omega_o, \underline{\omega})Y(\underline{\omega})$,
 wherein $\underline{\omega} = [\omega_1, \omega_2, \ldots \omega_K]$ represents the set of frequencies of the stacked Fourier transform vector that are being focused to the frequency $\omega_o$, and $K(\omega) = Q(\omega) \otimes P(\omega), \quad Q(\omega) = (C^T(\omega) \odot D^T(\omega))^T,$ $P(\omega) = (A^T(\omega) \odot B^T(\omega))^T,$ $$A(\omega) = \begin{pmatrix} A_{1-L}(\omega) & A_{1-(L-1)}(\omega) & \cdots & A_{1L}(\omega) \\ A_{2-L}(\omega) & A_{2-(L-1)}(\omega) & \cdots & A_{2L}(\omega) \\ \vdots & \vdots & \ddots & \vdots \\ A_{N-L}(\omega) & A_{N-(L-1)}(\omega) & \cdots & A_{NL}(\omega) \end{pmatrix},$$

$$B(\omega) = \begin{pmatrix} B_{1-L}(\omega) & B_{1-(L-1)}(\omega) & \cdots & B_{1L}(\omega) \\ B_{2-L}(\omega) & B_{2-(L-1)}(\omega) & \cdots & B_{2L}(\omega) \\ \vdots & \vdots & \ddots & \vdots \\ B_{N-L}(\omega) & B_{N-(L-1)}(\omega) & \cdots & B_{NL}(\omega) \end{pmatrix},$$

$A_{n,k}(\omega) = J_k((n-1)\beta(\omega)), \quad n = 1, 2, \ldots, N,$ $k = -L, -(L-1), \ldots 0, 1, \ldots, L,$ $B_{n,k}(\omega) = (-i)^k J_k((n-1)\beta(\omega)), \quad n = 1, 2, \ldots, N,$ $k = -L, -(L-1), \ldots 0, 1, \ldots, L,$ $C_{ik}(\omega) = J_k((i-1)\gamma(\omega)), \quad i = 1, 2, \ldots, M,$ $k = -L, -(L-1), \ldots 0, 1, \ldots, L,$ and $D_{ik}(\omega) = (-i)^k J_k((i-1)\gamma(\omega)), \quad i = 1, 2, \ldots, M,$ $k = -L, -(L-1), \ldots 0, 1, \ldots, L,$ wherein for the linear array $$\beta(\omega) = \frac{\omega d}{2c}, \quad \gamma(\omega) = \frac{\omega V T_r}{c}$$

wherein $J_k(\beta)$ represents the Bessel function of the $k^{th}$ order elevated at $\beta$ given by $$J_k(\beta) = \frac{1}{2\pi}\int_{-\pi}^{\pi} e^{-j(\beta\sin\psi - k\psi)} d\psi$$

$$= \frac{1}{\pi}\int_{0}^{\pi} \cos(\beta\sin\psi - k\psi) d\psi,$$

$J_{-k}(\beta) = (-i)^k J_k(\beta)$ and $$G(\underline{\omega}) = \begin{pmatrix} K(\omega_1) \\ K(\omega_2) \\ \vdots \\ K(\omega_K) \end{pmatrix}$$

wherein K represents the number of distinct frequency subbands in the stacked Fourier transform vector to be combined and L the number of Bessel function terms to be used;
wherein d represents the linear array inter-element spacing, V the platform velocity, $T_r$ the radar pulse repetition interval, and c the velocity of light; and
wherein $\odot$ represents the Khatri-Rao product and $\otimes$ represents the Kronecker product operations between two matrices respectively.

14. The method of claim 13 wherein the frequency focusing process is carried out in the spatial domain only.

15. The method of claim 13 wherein the frequency focusing process is carried out both in the spatial and temporal domains.

16. An apparatus comprising
a transmitter which is configured to transmit a plurality of pulse transmission signals;
a plurality of sensors arranged in an array, which are configured to receive a plurality of received signals;
a processor which is configured to use the plurality of received signals to determine a combination received signal;
wherein the combination received signal has a wideband frequency spectrum and the combination received signal includes interference, noise, and at least one return due to one or more of the plurality of pulse transmission signals from at least one target;
wherein each of the plurality of received signals has contributions from scatter returns from a plurality of arrival angles in a field of view of each sensor of the plurality of sensors and contributions due to each pulse transmission signal of the plurality of pulse transmission signals;
wherein the combination received signal includes a plurality of pulse return signals corresponding to the plurality of pulse transmission signals;
further comprising a computer memory;
and wherein the processor is further configured to stack the plurality of pulse return signals in the computer memory as a plurality of raw data vectors;
and wherein the processor is further configured to perform a Fourier transform on the plurality of raw data vectors to transform the plurality of raw data vectors into a plurality of Fourier transform vectors associated with a corresponding plurality of frequencies and to stack the plurality of Fourier transform vectors in the computer memory to form a stacked Fourier transform vector;

and wherein the processor is further configured to transform the stacked Fourier transform vector into a narrow band data vector by multiplying the stacked Fourier transform vector with a predetermined frequency compensating matrix;

and wherein the processor further configured to perform a traditional space-time adaptive method for target detection on the narrowband data vector to form a plurality of outputs.

17. The apparatus of claim 16
wherein the traditional space-time adaptive method includes supplying the narrowband data vector to a whitening filter and then to a matched filter to form the plurality of outputs.

18. The apparatus of claim 16 wherein
the plurality of outputs correspond to a plurality of azimuth and elevation angle pairs,
and further wherein the processor is configured to detect a peak output of the plurality of outputs and to select an azimuth and elevation angle pair corresponding to the peak output.

19. The apparatus of claim 18
further comprising a computer monitor and
wherein the processor is configured to display the peak output and the azimuth and elevation angle pair corresponding to the peak output on the computer monitor.

20. The apparatus of claim 16 wherein
the array of a plurality of sensors is a circular array of a plurality of sensors.

21. The apparatus of claim 16 wherein
the array of a plurality of sensors is a linear array of a plurality of sensors.

22. The apparatus of claim 16 wherein
each of the Fourier transform vectors includes a frequency dependent portion and a frequency independent portion;
and further wherein the processor is configured to store in the computer memory a set of compensating frequency dependent factors in a matrix form as a compensating matrix for the plurality of frequencies, and to stack a plurality of the compensating matrices in the computer memory and pre-multiplying them with their pseudo-inverses to form a predetermined frequency compensating matrix;
wherein the processor is configured to apply the predetermined frequency compensating matrix to the stacked Fourier transform vector to focus the frequency dependent portions of the Fourier transform vectors; and
wherein each compensating matrix involves one or more Bessel function dependent terms.

23. The apparatus of claim 22 wherein
the processor is configured to evaluate each of the one or more Bessel function dependent terms based on a frequency of the plurality of pulse transmission signals.

24. The apparatus of claim 22 wherein
each of the plurality of sensors has a first geometry; and
further wherein the processor is configured to evaluate each of the one or more Bessel function dependent terms based on the first geometry.

25. The apparatus of claim 22 further comprising
a platform;
wherein the plurality of sensors are attached to the platform which moves with a platform velocity;

and further wherein the processor is configured to evaluate each of the one or more Bessel function dependent terms based on the platform velocity.

26. The apparatus of claim 22 wherein
the plurality of pulse transmission signals have a pulse repetition rate;
and further wherein the processor is configured to evaluate each of the one or more Bessel function dependent terms based on the pulse repetition rate.

27. The apparatus of claim 20
wherein each of the Fourier transform vectors is given by $$X(\omega_i) = \begin{pmatrix} \underline{X}_1(\omega_i) \\ \underline{X}_2(\omega_i) \\ \vdots \\ \underline{X}_M(\omega_i) \end{pmatrix},$$

where $\underline{X}_1(\omega_i), \underline{X}_2(\omega_i), \ldots$ represent Fourier transforms of a first pulse return signal, a second pulse return signal . . . , and an M-th pulse return signal of the plurality of pulse return signals, each of the plurality of pulse return signals evaluated at frequencies $[\omega_1, \omega_2, \ldots \omega_i, \ldots \omega_K]$ for the circular array with N sensors, wherein the predetermined frequency compensating matrix denoted as $T(\omega_o, \underline{\omega})$, acts on the stacked Fourier transform vector given by $$Y(\underline{\omega}) = \begin{pmatrix} X(\omega_1) \\ X(\omega_2) \\ \vdots \\ X(\omega_K) \end{pmatrix}$$

and the predetermined-frequency compensating matrix is given by:

$T(\omega_o, \underline{\omega}) = K(\omega_o)G^*(\underline{\omega}) - K(\omega_o)G^*(\underline{\omega})(G(\underline{\omega})G^*(\underline{\omega}) + \epsilon I)^{-1}G(\underline{\omega})G^*(\underline{\omega})$, wherein the predetermined frequency compensating matrix generates the narrowband data vector which is given by $Z(\omega_o) = T(\omega_o, \underline{\omega})Y(\underline{\omega})$, wherein $\underline{\omega} = [\omega_1, \omega_2, \ldots \omega_K]$ represents the set of frequencies that are being compensated to the frequency $\omega_o$, and $$K(\omega) = Q(\omega) \otimes P(\omega), \quad Q(\omega) = (C^T(\omega) \odot D^T(\omega))^T,$$

$$P(\omega) = (A^T(\omega) \odot B^T(\omega))^T,$$

$$A(\omega) = \begin{pmatrix} A_{1-L}(\omega) & A_{1-(L-1)}(\omega) & \cdots & A_{1L}(\omega) \\ A_{2-L}(\omega) & A_{2-(L-1)}(\omega) & \cdots & A_{2L}(\omega) \\ \vdots & \vdots & \ddots & \vdots \\ A_{N-L}(\omega) & A_{N-(L-1)}(\omega) & \cdots & A_{NL}(\omega) \end{pmatrix},$$

$$B(\omega) = \begin{pmatrix} B_{1-L}(\omega) & B_{1-(L-1)}(\omega) & \cdots & B_{1L}(\omega) \\ B_{2-L}(\omega) & B_{2-(L-1)}(\omega) & \cdots & B_{2L}(\omega) \\ \vdots & \vdots & \ddots & \vdots \\ B_{N-L}(\omega) & B_{N-(L-1)}(\omega) & \cdots & B_{NL}(\omega) \end{pmatrix},$$

$A_{n,k}(\omega) = J_k(\beta(\omega))e^{jk\theta_n}, \quad n = 1, 2, \ldots, N$, $k = -L, -(L-1), \ldots 0, 1, \ldots, L$, $B_{n,k}(\omega) = J_k(\beta(\omega))e^{-jk\theta_n}, \quad n = 1, 2, \ldots, N$, -continued $k = -L, -(L-1), \ldots 0, 1, \ldots, L,$ $C_{ik}(\omega) = J_k((i-1)\gamma(\omega))e^{jk\theta_1}, \quad i = 1, 2, \ldots, M,$ $k = -L, -(L-1), \ldots 0, 1, \ldots, L,$ and $D_{ik}(\omega) = J_k((i-1)\gamma(\omega))e^{-jk\theta_1}, \quad i = 1, 2, \ldots, M,$ $k = -L, -(L-1), \ldots 0, 1, \ldots, L,$ where for a circular array $$\beta(\omega) = \frac{\omega d}{2c}, \quad \gamma(\omega) = \frac{\omega V T_r}{c}$$

where $J_k(\beta)$ represents the Bessel function of the $k^{th}$ order elevated at $\beta$ given by $$J_k(\beta) = \frac{1}{2\pi}\int_{-\pi}^{\pi} e^{-j(\beta\sin\psi - k\psi)} d\psi$$

$$= \frac{1}{\pi}\int_0^{\pi} \cos(\beta\sin\psi - k\psi) d\psi,$$

$J_{-k}(\beta) = (-i)^k J_k(\beta)$ and $$G(\underline{\omega}) = \begin{pmatrix} K(\omega_1) \\ K(\omega_2) \\ \vdots \\ K(\omega_K) \end{pmatrix}$$

wherein K represents the number of distinct frequency subbands in the plurality of Fourier transform vectors and L the number of Bessel function terms to be used;

wherein r represents the circular array radius, V the platform velocity, $T_r$ a pulse repetition interval of the plurality of pulse transmission signals, and c the velocity of light;

and wherein $\odot$ represents the Khatri-Rao product and $\otimes$ represents the Kronecker product operations between two matrices respectively.

28. The apparatus of claim 21 wherein each of the Fourier transform vectors is given by $$X(\omega) = \begin{pmatrix} \underline{X}_1(\omega) \\ \underline{X}_2(\omega) \\ \vdots \\ \underline{X}_M(\omega) \end{pmatrix},$$

where $\underline{X}_1(\omega), \underline{X}_2(\omega), \ldots$ represent the transforms of the first pulse return signal, the second pulse return signal ..., the M-th pulse return signal ..., evaluated at frequency $\omega$ for a linear array with N sensors, wherein the predetermined frequency compensating matrix is given by $T(\omega_o, \underline{\omega})$, and the predetermined frequency compensating matrix acts on the stacked Fourier transform vector given by $$Y(\underline{\omega}) = \begin{pmatrix} X(\omega_1) \\ X(\omega_2) \\ \vdots \\ X(\omega_K) \end{pmatrix}$$

and wherein the predetermined frequency compensating matrix is given by $T(\omega_o, \underline{\omega}) = K(\omega_o)G^*(\underline{\omega}) - K(\omega_o)G^*(\underline{\omega})(G(\underline{\omega})G^*(\underline{\omega}) + \epsilon I)^{-1}G(\underline{\omega})G^*(\omega),$ wherein the predetermined frequency compensating matrix generates by a frequency focusing process the narrowband data vector, given by $Z(\omega_o) = T(\omega_o, \underline{\omega})Y(\underline{\omega})$, wherein $\underline{\omega} = [\omega_1, \omega_2, \ldots \omega_K]$ represents the set of frequencies of the stacked Fourier transform vector that are being focused to the frequency $\omega_o$, and $K(\omega) = Q(\omega) \otimes P(\omega), \quad Q(\omega) = (C^T(\omega) \odot D^T(\omega))^T,$ $P(\omega) = (A^T(\omega) \odot B^T(\omega))^T,$ $$A(\omega) = \begin{pmatrix} A_{1,-L}(\omega) & A_{1,-(L-1)}(\omega) & \cdots & A_{1L}(\omega) \\ A_{2,-L}(\omega) & A_{2,-(L-1)}(\omega) & \cdots & A_{2L}(\omega) \\ \vdots & \vdots & \ddots & \vdots \\ A_{N,-L}(\omega) & A_{N,-(L-1)}(\omega) & \cdots & A_{NL}(\omega) \end{pmatrix},$$

$$B(\omega) = \begin{pmatrix} B_{1,-L}(\omega) & B_{1,-(L-1)}(\omega) & \cdots & B_{1L}(\omega) \\ B_{2,-L}(\omega) & B_{2,-(L-1)}(\omega) & \cdots & B_{2L}(\omega) \\ \vdots & \vdots & \ddots & \vdots \\ B_{N,-L}(\omega) & B_{N,-(L-1)}(\omega) & \cdots & B_{NL}(\omega) \end{pmatrix},$$

$A_{n,k}(\omega) = J_k((n-1)\beta(\omega)), \quad n = 1, 2, \ldots, N,$ $k = -L, -(L-1), \ldots 0, 1, \ldots, L,$ $B_{n,k}(\omega) = (-i)^k J_k((n-1)\beta(\omega)), \quad n = 1, 2, \ldots, N,$ $k = -L, -(L-1), \ldots 0, 1, \ldots, L,$ $C_{ik}(\omega) = J_k((i-1)\gamma(\omega)), \quad i = 1, 2, \ldots, M,$ $k = -L, -(L-1), \ldots 0, 1, \ldots, L,$ and $D_{ik}(\omega) = (-i)^k J_k((i-1)\gamma(\omega)), \quad i = 1, 2, \ldots, M,$ $k = -L, -(L-1), \ldots 0, 1, \ldots, L,$ wherein for the linear array $$\beta(\omega) = \frac{\omega d}{2c}, \quad \gamma(\omega) = \frac{\omega V T_r}{c}$$

wherein $J_k(\beta)$ represents the Bessel function of the $k^{th}$ order elevated at $\beta$ given by $$J_k(\beta) = \frac{1}{2\pi}\int_{-\pi}^{\pi} e^{-j(\beta\sin\psi - k\psi)} d\psi$$

$$= \frac{1}{\pi}\int_0^{\pi} \cos(\beta\sin\psi - k\psi) d\psi,$$

$J_{-k}(\beta) = (-i)^k J_k(\beta)$

-continued and $$G(\underline{\omega}) = \begin{pmatrix} K(\omega_1) \\ K(\omega_2) \\ \vdots \\ K(\omega_K) \end{pmatrix}$$

wherein K represents the number of distinct frequency subbands in the stacked Fourier transform vector to be combined and L the number of Bessel function terms to be used;

wherein d represents the linear array inter-element spacing, V the platform velocity, $T_r$ the radar pulse repetition interval, and c the velocity of light; and wherein ⊙ represents the Khatri-Rao product and ⊗ represents the Kronecker product operations between two matrices respectively.

29. The apparatus of claim 28
wherein the frequency focusing process is carried out in the spatial domain only.

30. The method of claim 28
wherein the frequency focusing process is carried out both in the spatial and temporal domains.

* * * * *